(12) United States Patent
Kamat et al.

(10) Patent No.: US 11,428,160 B2
(45) Date of Patent: Aug. 30, 2022

(54) GAS TURBINE ENGINE WITH INTERDIGITATED TURBINE AND GEAR ASSEMBLY

(71) Applicant: General Electric Company, Schenectady, NY (US)

(72) Inventors: Pranav Kamat, Bangalore (IN); Bhaskar Nanda Mondal, Bangalore (IN); Jeffrey Donald Clements, Mason, OH (US); Vaibhav Madhukar Deshmukh, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/139,138

(22) Filed: Dec. 31, 2020

(65) Prior Publication Data
US 2022/0205387 A1 Jun. 30, 2022

(51) Int. Cl.
*F02C 7/36* (2006.01)
*F02C 3/06* (2006.01)
(Continued)

(52) U.S. Cl.
CPC ............... *F02C 3/06* (2013.01); *F01D 1/26* (2013.01); *F02C 3/067* (2013.01); *F02C 7/36* (2013.01);
(Continued)

(58) Field of Classification Search
CPC ............. F02C 3/067; F02C 7/36; F02K 3/072
See application file for complete search history.

(56) References Cited

U.S. PATENT DOCUMENTS

| 633,992 A | 10/1899 | Fullerton |
| 2,360,130 A | 10/1944 | Heppner |

(Continued)

FOREIGN PATENT DOCUMENTS

| CA | 2376163 A1 | 1/2001 |
| CN | 103754363 A | 4/2014 |

(Continued)

OTHER PUBLICATIONS

Bobula et al., Effect of a part-span variable inlet guide vane on the performance of a high-bypass turbofan engine, Aircraft Propulsion and Power, NASA-TM-82617, E-869, AVRADCOM-TR-81-C-10, Seventeenth Joint Propulsion Conf.; Colorado Springs, CO; Jul. 27, 1981; 15 pages. https://ntrs.nasa.gov/search.jsp?R=19810016546.

(Continued)

*Primary Examiner* — Gerald L Sung
(74) *Attorney, Agent, or Firm* — Dority & Manning, P.A.

(57) ABSTRACT

A gas turbine engine having an interdigitated turbine assembly including a first turbine rotor and a second turbine rotor, wherein a total number of stages at the interdigitated turbine assembly is between 3 and 8, and an average stage pressure ratio at the interdigitated turbine assembly is between 1.3 and 1.9. A gear assembly is configured to receive power from the interdigitated turbine assembly, and a fan assembly is configured to receive power from the gear assembly. The interdigitated turbine assembly and the gear assembly are together configured to allow the second turbine rotor to rotate at a second rotational speed greater than a first rotational speed at the first turbine rotor. The fan assembly and the gear assembly are together configured to allow the fan assembly to rotate at a third rotational speed less than the first rotational speed and the second rotational speed. The interdigitated turbine assembly, the gear assembly, and the (Continued)

fan assembly together have a maximum AN² at the second turbine rotor between 30 and 90.

16 Claims, 3 Drawing Sheets

(51) Int. Cl.
  F02K 3/04        (2006.01)
  F02K 3/072       (2006.01)
  F01D 1/26        (2006.01)
  F02C 3/067       (2006.01)

(52) U.S. Cl.
  CPC ............... *F02K 3/04* (2013.01); *F02K 3/072* (2013.01); *F05D 2220/32* (2013.01); *F05D 2250/44* (2013.01); *F05D 2260/40311* (2013.01)

(56) References Cited

U.S. PATENT DOCUMENTS

| | | |
|---|---|---|
| 2,429,061 A | 10/1947 | Hunter |
| 2,446,999 A | 8/1948 | Camilli |
| 2,478,206 A | 8/1949 | Redding |
| 2,509,442 A | 5/1950 | Matheisel |
| 2,545,916 A | 3/1951 | Clark |
| 2,548,975 A | 4/1951 | Hawthorne |
| 2,644,298 A | 7/1953 | McLeod et al. |
| 2,712,727 A | 7/1955 | Morley et al. |
| 2,837,671 A | 6/1958 | Reardon et al. |
| 2,871,038 A | 1/1959 | Comery |
| 2,928,627 A | 3/1960 | Johnson |
| 3,015,524 A | 1/1962 | Slayter et al. |
| 3,034,298 A | 5/1962 | White |
| 3,085,396 A | 4/1963 | Kent et al. |
| 3,163,231 A | 12/1964 | Barnes et al. |
| 3,170,292 A | 2/1965 | Howes et al. |
| 3,224,194 A | 12/1965 | DeFeo et al. |
| 3,248,880 A | 5/1966 | Hull, Jr. et al. |
| 3,335,483 A | 8/1967 | Howald |
| 3,351,319 A | 11/1967 | Frost |
| 3,383,033 A | 5/1968 | Moore |
| 3,391,540 A | 7/1968 | Bauger et al. |
| 3,451,215 A | 6/1969 | Barr |
| 3,478,421 A | 11/1969 | Preece |
| 3,501,245 A | 3/1970 | Ivanko |
| 3,501,251 A | 3/1970 | Haglund et al. |
| 3,528,241 A | 9/1970 | Venable et al. |
| 3,546,880 A | 12/1970 | Schwaar |
| 3,572,728 A | 3/1971 | Smuland |
| 3,588,269 A | 6/1971 | Wall, Jr. |
| 3,602,602 A | 8/1971 | Motta |
| 3,673,802 A | 4/1972 | Krebs et al. |
| 3,688,505 A | 9/1972 | Dison |
| 3,703,076 A | 11/1972 | Hagemeister |
| 3,703,081 A | 11/1972 | Krebs et al. |
| 3,704,075 A | 11/1972 | Karstensen et al. |
| 3,746,463 A | 7/1973 | Stock et al. |
| 3,747,343 A | 7/1973 | Rosen |
| 3,768,921 A | 10/1973 | Brown et al. |
| 3,779,006 A | 12/1973 | Lewis et al. |
| 3,788,065 A | 1/1974 | Markowski |
| 3,837,602 A | 9/1974 | Mullins |
| 3,842,595 A | 10/1974 | Smith et al. |
| 3,844,115 A | 10/1974 | Freid |
| 3,861,136 A | 1/1975 | Blenkhorn |
| 3,861,139 A | 1/1975 | Jones |
| 3,873,236 A | 3/1975 | Gall |
| 3,903,690 A | 9/1975 | Jones |
| 3,956,887 A | 5/1976 | MacDonald |
| 3,974,313 A | 8/1976 | James |
| 3,989,410 A | 11/1976 | Ferrari |
| 3,997,132 A | 12/1976 | Erwin |
| 4,005,575 A | 2/1977 | Scott et al. |
| 4,021,142 A | 5/1977 | Violette |
| 4,055,997 A | 11/1977 | Kniat |
| 4,065,077 A | 12/1977 | Brooks |
| 4,085,581 A | 4/1978 | Caruel et al. |
| 4,096,296 A | 6/1978 | Galmiche et al. |
| 4,103,905 A | 8/1978 | Desmond et al. |
| 4,159,624 A | 7/1979 | Gruner |
| 4,171,786 A | 10/1979 | Krenz |
| 4,209,149 A | 6/1980 | Morris et al. |
| 4,213,738 A | 7/1980 | Williams |
| 4,219,868 A | 8/1980 | Bowman et al. |
| 4,254,619 A | 3/1981 | Giffin, III et al. |
| 4,282,709 A | 8/1981 | Kronogard |
| 4,296,599 A | 10/1981 | Adamson |
| 4,314,791 A | 2/1982 | Weiler |
| 4,332,427 A | 6/1982 | Sargent et al. |
| 4,348,157 A | 9/1982 | Campbell et al. |
| 4,424,667 A | 1/1984 | Fanning |
| 4,433,261 A | 2/1984 | Nashiki et al. |
| 4,433,473 A | 2/1984 | Benedetti |
| 4,433,955 A | 2/1984 | Johnston |
| 4,564,543 A | 1/1986 | Ritter |
| 4,578,018 A | 3/1986 | Pope |
| 4,595,340 A | 6/1986 | Klassen et al. |
| 4,596,116 A | 6/1986 | Mandet et al. |
| 4,621,978 A | 11/1986 | Stuart |
| 4,664,599 A | 5/1987 | Robbins et al. |
| 4,686,823 A | 8/1987 | Coburn et al. |
| 4,704,862 A | 11/1987 | Dennison et al. |
| 4,720,236 A | 1/1988 | Stevens |
| 4,790,133 A | 12/1988 | Stuart |
| 4,809,498 A | 3/1989 | Giffin, III et al. |
| 4,817,382 A | 4/1989 | Rudolph et al. |
| 4,827,712 A | 5/1989 | Coplin |
| 4,860,537 A | 8/1989 | Taylor |
| 4,909,031 A | 3/1990 | Grieb |
| 4,916,892 A | 4/1990 | Pope |
| 4,916,894 A | 4/1990 | Adamson et al. |
| 4,920,742 A | 5/1990 | Nash et al. |
| 4,928,978 A | 5/1990 | Shaffer et al. |
| 4,936,748 A | 6/1990 | Adamson et al. |
| 4,947,642 A | 8/1990 | Grieb et al. |
| 4,969,325 A | 11/1990 | Adamson et al. |
| 4,981,414 A | 1/1991 | Sheets |
| 4,986,737 A | 1/1991 | Erdmann |
| 4,987,736 A | 1/1991 | Ciokajlo et al. |
| 5,010,729 A | 4/1991 | Adamson et al. |
| 5,015,540 A | 5/1991 | Borom et al. |
| 5,074,109 A | 12/1991 | Mandet et al. |
| 5,079,916 A | 1/1992 | Johnson |
| 5,103,635 A | 4/1992 | Lardellier |
| 5,107,676 A | 4/1992 | Hadaway et al. |
| 5,117,637 A | 6/1992 | Howell et al. |
| 5,127,799 A | 7/1992 | Berry |
| 5,131,813 A | 7/1992 | Przytulski et al. |
| 5,142,859 A | 9/1992 | Glezer et al. |
| 5,145,316 A | 9/1992 | Birch |
| 5,167,383 A | 12/1992 | Nozaki |
| 5,188,506 A | 2/1993 | Creevy et al. |
| 5,197,281 A | 3/1993 | Przytulski et al. |
| 5,207,064 A | 5/1993 | Ciokajlo et al. |
| 5,218,816 A | 6/1993 | Plemmons et al. |
| 5,257,903 A | 11/1993 | Allmon et al. |
| 5,265,413 A | 11/1993 | Cannon et al. |
| 5,272,868 A | 12/1993 | Ciokajlo et al. |
| 5,274,999 A | 1/1994 | Rohra et al. |
| 5,284,347 A | 2/1994 | Pope |
| 5,300,845 A | 4/1994 | Fanning et al. |
| 5,307,622 A | 5/1994 | Ciokajlo et al. |
| 5,330,854 A | 7/1994 | Singh et al. |
| 5,336,350 A | 8/1994 | Singh |
| 5,361,580 A | 11/1994 | Ciokajlo et al. |
| 5,363,641 A | 11/1994 | Dixon et al. |
| 5,388,964 A | 2/1995 | Ciokajlo et al. |
| 5,392,614 A | 2/1995 | Coffinberry |
| 5,400,952 A | 3/1995 | Hetico et al. |
| 5,402,638 A | 4/1995 | Johnson |
| 5,404,713 A | 4/1995 | Johnson |
| 5,406,787 A | 4/1995 | Terrier |

(56) References Cited

U.S. PATENT DOCUMENTS

| | | |
|---|---|---|
| 5,411,370 A | 5/1995 | Varsik |
| 5,443,230 A | 8/1995 | Lord et al. |
| 5,443,590 A | 8/1995 | Ciokajlo et al. |
| 5,458,457 A | 10/1995 | Goto et al. |
| 5,465,571 A | 11/1995 | Clark |
| 5,470,524 A | 11/1995 | Krueger et al. |
| 5,488,825 A | 2/1996 | Davis et al. |
| 5,494,404 A | 2/1996 | Furseth et al. |
| 5,562,408 A | 10/1996 | Proctor et al. |
| 5,575,617 A | 11/1996 | Marmilic et al. |
| 5,577,378 A | 11/1996 | Althaus et al. |
| 5,617,761 A | 4/1997 | Kawakami |
| 5,627,761 A | 5/1997 | Pollard |
| 5,628,938 A | 5/1997 | Sangeeta et al. |
| 5,630,700 A | 5/1997 | Olsen et al. |
| 5,632,600 A | 5/1997 | Hull |
| 5,694,765 A | 12/1997 | Hield et al. |
| 5,697,208 A | 12/1997 | Glezer et al. |
| 5,769,604 A | 6/1998 | Sealol |
| 5,797,105 A | 8/1998 | Nakaya et al. |
| 5,797,723 A | 8/1998 | Frost et al. |
| 5,797,725 A | 8/1998 | Rhodes |
| 5,809,772 A | 9/1998 | Giffin, III et al. |
| 5,904,470 A | 5/1999 | Kerrebrock et al. |
| 5,915,677 A | 6/1999 | Yajima et al. |
| 5,921,506 A | 7/1999 | Appa |
| 5,925,961 A | 7/1999 | Sugiyanma |
| 5,953,919 A | 9/1999 | Meylan |
| 5,961,067 A | 10/1999 | Hall et al. |
| 5,967,746 A | 10/1999 | Hagi et al. |
| 5,975,537 A | 11/1999 | Turnquist et al. |
| 5,988,980 A | 11/1999 | Busbey et al. |
| 5,993,150 A | 11/1999 | Liotta et al. |
| 5,996,335 A | 12/1999 | Ebel |
| 6,024,898 A | 2/2000 | Steibel et al. |
| 6,035,627 A | 3/2000 | Liu |
| 6,145,840 A | 11/2000 | Pope |
| 6,164,656 A | 12/2000 | Frost |
| 6,212,870 B1 | 4/2001 | Thompson et al. |
| 6,220,814 B1 | 4/2001 | Brushwood et al. |
| 6,250,061 B1 | 6/2001 | Orlando |
| 6,258,737 B1 | 7/2001 | Steibel et al. |
| 6,263,664 B1 | 7/2001 | Tanigawa et al. |
| 6,272,844 B1 | 8/2001 | Rakhmailov et al. |
| 6,314,739 B1 | 11/2001 | Howell et al. |
| 6,330,995 B1 | 12/2001 | Mangeiga et al. |
| 6,346,892 B1 | 2/2002 | DeMers et al. |
| 6,391,948 B1 | 5/2002 | Clarke et al. |
| 6,393,831 B1 | 5/2002 | Chamis et al. |
| 6,394,389 B1 | 5/2002 | Saiz |
| 6,398,487 B1 | 6/2002 | Wallace et al. |
| 6,403,158 B1 | 6/2002 | Corman |
| 6,409,469 B1 | 6/2002 | Tse |
| 6,409,472 B1 | 6/2002 | McMahon et al. |
| 6,428,271 B1 | 8/2002 | Ress, Jr. et al. |
| 6,431,820 B1 | 8/2002 | Beacock et al. |
| 6,442,940 B1 | 9/2002 | Young et al. |
| 6,454,535 B1 | 9/2002 | Goshorn et al. |
| 6,468,032 B2 | 10/2002 | Patel |
| 6,503,441 B2 | 1/2003 | Corman et al. |
| 6,530,744 B2 | 3/2003 | Liotta et al. |
| 6,540,231 B1 | 4/2003 | Trantow et al. |
| 6,546,713 B1 | 4/2003 | Hidaka et al. |
| 6,546,732 B1 | 4/2003 | Young et al. |
| 6,546,734 B2 | 4/2003 | Antoine et al. |
| 6,550,777 B2 | 4/2003 | Turnquist et al. |
| 6,612,809 B2 | 9/2003 | Czachor et al. |
| 6,619,030 B1 | 9/2003 | Seda et al. |
| 6,666,017 B2 | 12/2003 | Prentice et al. |
| 6,676,369 B2 | 1/2004 | Brauer et al. |
| 6,684,626 B1 | 2/2004 | Orlando et al. |
| 6,708,482 B2 | 3/2004 | Seda |
| 6,711,887 B2 | 3/2004 | Orlando et al. |
| 6,732,502 B2 | 5/2004 | Seda et al. |
| 6,758,477 B2 | 7/2004 | Brauer et al. |
| 6,761,034 B2 | 7/2004 | Niday et al. |
| 6,763,652 B2 | 7/2004 | Baughman et al. |
| 6,763,654 B2 | 7/2004 | Orlando et al. |
| 6,792,745 B2 | 9/2004 | Wojciechowski |
| 6,811,376 B2 | 11/2004 | Arel et al. |
| 6,823,675 B2 | 11/2004 | Brunell et al. |
| 6,851,263 B2 | 2/2005 | Stumpf |
| 6,883,303 B1 | 4/2005 | Seda |
| 6,893,214 B2 | 5/2005 | Alford et al. |
| 6,978,971 B1 | 12/2005 | Dun |
| 6,981,841 B2 | 1/2006 | Krammer et al. |
| 6,991,427 B2 | 1/2006 | Scott |
| 7,044,470 B2 | 5/2006 | Zheng |
| 7,048,496 B2 | 5/2006 | Proctor et al. |
| 7,062,920 B2 | 6/2006 | McMasters et al. |
| 7,093,440 B2 | 8/2006 | Howell et al. |
| 7,114,911 B2 | 10/2006 | Martin et al. |
| 7,137,245 B2 | 11/2006 | Graziosi et al. |
| 7,144,349 B2 | 12/2006 | Mitrovic |
| 7,185,484 B2 | 3/2007 | Griffin, III et al. |
| 7,186,073 B2 | 3/2007 | Orlando et al. |
| 7,186,078 B2 | 3/2007 | Tanaka |
| 7,195,446 B2 | 3/2007 | Seda et al. |
| 7,249,462 B2 | 7/2007 | Aumont et al. |
| 7,269,938 B2 | 9/2007 | Moniz et al. |
| 7,290,386 B2 | 11/2007 | Orlando et al. |
| 7,296,398 B2 | 11/2007 | Moniz et al. |
| 7,306,826 B2 | 12/2007 | Subramanian et al. |
| 7,329,087 B2 | 2/2008 | Cairo et al. |
| 7,334,392 B2 | 2/2008 | Moniz et al. |
| 7,334,981 B2 | 2/2008 | Moniz et al. |
| 7,334,985 B2 | 2/2008 | Lutjen et al. |
| 7,370,467 B2 | 5/2008 | Elftheriou et al. |
| 7,427,186 B2 | 9/2008 | Gerez et al. |
| 7,445,425 B2 | 11/2008 | Ferra et al. |
| 7,451,592 B2 | 11/2008 | Taylor et al. |
| 7,464,554 B2 | 12/2008 | Cheung et al. |
| 7,490,460 B2 | 2/2009 | Moniz et al. |
| 7,493,753 B2 | 2/2009 | Moniz et al. |
| 7,510,371 B2 | 3/2009 | Orlando et al. |
| 7,513,102 B2 | 4/2009 | Moniz et al. |
| 7,513,103 B2 | 4/2009 | Orlando et al. |
| 7,514,810 B2 | 4/2009 | Kern et al. |
| 7,594,388 B2 | 9/2009 | Cherry et al. |
| 7,600,370 B2 | 10/2009 | Dawson |
| 7,600,967 B2 | 10/2009 | Pezzetti, Jr. et al. |
| 7,614,767 B2 | 11/2009 | Zulim et al. |
| 7,614,792 B2 | 11/2009 | Wade et al. |
| 7,685,808 B2 | 3/2010 | Orlando et al. |
| 7,685,828 B2 | 3/2010 | Foucault et al. |
| 7,694,505 B2 | 4/2010 | Schilling |
| 7,703,290 B2 | 4/2010 | Bladon et al. |
| 7,716,914 B2 | 5/2010 | Schilling |
| 7,726,113 B2 | 6/2010 | Orlando et al. |
| 7,736,719 B2 | 6/2010 | Cattaneo et al. |
| 7,758,303 B1 | 7/2010 | Wadia et al. |
| 7,758,310 B2 | 7/2010 | Cotton et al. |
| 7,770,377 B2 | 8/2010 | Rolt |
| 7,788,898 B2 | 9/2010 | Kern et al. |
| 7,791,235 B2 | 9/2010 | Kern et al. |
| 7,797,941 B2 | 9/2010 | Munsell et al. |
| 7,811,049 B2 | 10/2010 | Xu |
| 7,832,193 B2 | 11/2010 | Orlando et al. |
| 7,841,165 B2 | 11/2010 | Orlando et al. |
| 7,845,158 B2 | 12/2010 | Udall |
| 7,845,902 B2 | 12/2010 | Merchant |
| 7,866,159 B2 | 1/2011 | Bowman et al. |
| 7,882,693 B2 | 2/2011 | Schilling |
| 7,926,259 B2 | 4/2011 | Orlando et al. |
| 7,927,075 B2 | 4/2011 | Suciu et al. |
| 7,909,335 B2 | 5/2011 | Turnquist et al. |
| 7,937,927 B2 | 5/2011 | Suciu et al. |
| 7,950,234 B2 | 5/2011 | Radonovich et al. |
| 7,959,532 B2 | 6/2011 | Suciu et al. |
| 7,963,480 B2 | 6/2011 | Lafont et al. |
| 7,966,806 B2 | 6/2011 | Henry et al. |
| 7,966,833 B2 | 6/2011 | Beutin et al. |
| 7,971,826 B2 | 7/2011 | Journade et al. |
| 8,011,877 B2 | 9/2011 | Schilling et al. |

(56) References Cited

U.S. PATENT DOCUMENTS

| | | |
|---|---|---|
| 8,015,798 B2 | 9/2011 | Norris et al. |
| 8,033,092 B2 | 10/2011 | Suciu et al. |
| 8,061,649 B2 | 11/2011 | Journade et al. |
| 8,061,968 B2 | 11/2011 | Merry et al. |
| 8,061,969 B2 | 11/2011 | Durocher et al. |
| 8,074,440 B2 | 12/2011 | Kohlenberg et al. |
| 8,083,030 B2 | 12/2011 | Portlock |
| 8,083,176 B2 | 12/2011 | Lafont et al. |
| 8,090,456 B2 | 1/2012 | Karpman et al. |
| 8,093,747 B2 | 1/2012 | Pearson et al. |
| 8,109,716 B2 | 2/2012 | Glahn et al. |
| 8,109,717 B2 | 2/2012 | Glahn et al. |
| 8,127,528 B2 | 3/2012 | Roberge |
| 8,128,339 B2 | 3/2012 | Kondo et al. |
| 8,141,371 B1 | 3/2012 | Habarou et al. |
| 8,146,372 B2 | 4/2012 | Carrere et al. |
| 8,152,445 B2 | 4/2012 | Guemmer |
| 8,152,469 B2 | 4/2012 | Suciu et al. |
| 8,166,748 B2 | 5/2012 | Schilling |
| 8,167,545 B2 | 5/2012 | Glahn et al. |
| 8,171,736 B2 | 5/2012 | Hawie et al. |
| 8,191,352 B2 | 6/2012 | Schilling |
| 8,206,083 B2 | 6/2012 | Garrison |
| 8,240,980 B1 | 8/2012 | Liang |
| 8,245,519 B1 | 8/2012 | Liang |
| 8,246,305 B2 | 8/2012 | Lecuyer et al. |
| 8,272,643 B2 | 9/2012 | Garrison et al. |
| 8,276,362 B2 | 10/2012 | Suciu et al. |
| 8,292,574 B2 | 10/2012 | Wood et al. |
| 8,314,505 B2 | 11/2012 | McLoughlin et al. |
| 8,336,290 B2 | 12/2012 | Glynn et al. |
| 8,336,813 B2 | 12/2012 | Bonnaud et al. |
| 8,350,398 B2 | 1/2013 | Butt |
| 8,365,510 B2 | 2/2013 | Lugg |
| 8,366,378 B2 | 2/2013 | Beckford et al. |
| 8,366,382 B1 | 2/2013 | Muldoon et al. |
| 8,371,127 B2 | 2/2013 | Durocher et al. |
| 8,371,812 B2 | 2/2013 | Manteiga et al. |
| 8,375,695 B2 | 2/2013 | Schilling et al. |
| 8,387,991 B2 | 3/2013 | Durling |
| 8,402,740 B2 | 3/2013 | Guemmer |
| 8,402,742 B2 | 3/2013 | Roberge et al. |
| 8,403,643 B2 | 3/2013 | Welsh |
| 8,439,365 B2 | 5/2013 | Haynes et al. |
| 8,459,035 B2 | 6/2013 | Smith et al. |
| 8,464,426 B2 | 6/2013 | Kirchner et al. |
| 8,464,511 B1 | 6/2013 | Ribarov et al. |
| 8,511,986 B2 | 8/2013 | Alvanos et al. |
| 8,517,666 B2 | 8/2013 | Alvanos et al. |
| 8,534,077 B2 | 9/2013 | Beutin et al. |
| 8,600,707 B1 | 12/2013 | El-Aini et al. |
| 8,615,877 B2 | 12/2013 | Charleux et al. |
| 8,656,589 B2 | 2/2014 | Kurt-Elli |
| 8,661,781 B2 | 3/2014 | Moore et al. |
| 8,667,773 B2 | 3/2014 | Silkowski |
| 8,667,775 B1 | 3/2014 | Kisska et al. |
| 8,667,777 B2 | 3/2014 | Gallet |
| 8,668,437 B1 | 3/2014 | Liang |
| 8,682,454 B2 | 3/2014 | Fuller et al. |
| 8,690,527 B2 | 4/2014 | Matwey et al. |
| 8,695,917 B2 | 4/2014 | Cranga et al. |
| 8,708,643 B2 | 4/2014 | Griffin et al. |
| 8,721,283 B2 | 5/2014 | Swift et al. |
| 8,721,293 B2 | 5/2014 | Arilla et al. |
| 8,733,693 B2 | 5/2014 | Journade et al. |
| 8,740,136 B2 | 6/2014 | Audart-Noel et al. |
| 8,740,224 B2 | 6/2014 | Zheng et al. |
| 8,747,055 B2 | 6/2014 | McCune et al. |
| 8,753,073 B2 | 6/2014 | Albers et al. |
| 8,756,908 B2 | 6/2014 | Sheridan et al. |
| 8,756,935 B2 | 6/2014 | Duval et al. |
| 8,763,406 B2 | 7/2014 | Pieussergues et al. |
| 8,776,525 B2 | 7/2014 | Oechsle |
| 8,784,045 B2 | 7/2014 | Zoric et al. |
| 8,807,916 B2 | 8/2014 | Sheridan et al. |
| 8,844,265 B2 | 9/2014 | Adams et al. |
| 8,876,462 B2 | 11/2014 | Balk et al. |
| 8,887,487 B2 | 11/2014 | Kupratis et al. |
| 8,890,343 B2 | 11/2014 | Bulin et al. |
| 8,894,368 B2 | 11/2014 | Jones |
| 8,905,711 B2 | 12/2014 | Suciu et al. |
| 8,905,719 B2 | 12/2014 | Kray et al. |
| 8,915,700 B2 | 12/2014 | Kupratis et al. |
| 8,919,133 B2 | 12/2014 | Bart et al. |
| 8,926,270 B2 | 1/2015 | Karafillis et al. |
| 8,931,285 B2 | 1/2015 | McCune et al. |
| 8,935,073 B2 | 1/2015 | Hurwitz et al. |
| 8,935,913 B2 | 1/2015 | Kupratis et al. |
| 8,943,796 B2 | 2/2015 | McCaffrey |
| 8,943,835 B2 | 2/2015 | Corsmeier et al. |
| 8,967,967 B2 | 3/2015 | Stretton et al. |
| 8,991,191 B2 | 3/2015 | Diaz et al. |
| 8,997,500 B2 | 4/2015 | Glahn et al. |
| 8,998,573 B2 | 4/2015 | Albers et al. |
| 9,011,076 B2 | 4/2015 | Suciu et al. |
| 9,016,041 B2 | 4/2015 | Baughman et al. |
| 9,017,018 B2 | 4/2015 | Vest |
| 9,017,028 B2 | 4/2015 | Fabre |
| 9,021,812 B2 | 5/2015 | Pardington et al. |
| 9,022,725 B2 | 5/2015 | Merry et al. |
| 9,024,504 B2 | 5/2015 | Nishio et al. |
| 9,028,200 B2 | 5/2015 | Suciu et al. |
| 9,032,740 B2 | 5/2015 | Journade et al. |
| 9,039,364 B2 | 5/2015 | Alvanos et al. |
| 9,051,044 B2 | 6/2015 | Talasco et al. |
| 9,074,485 B2 | 7/2015 | Suciu et al. |
| 9,080,512 B2 | 7/2015 | Suciu et al. |
| 9,103,227 B2 | 8/2015 | Kupratis et al. |
| 9,121,347 B2 | 9/2015 | Bellabal et al. |
| 9,121,448 B2 | 9/2015 | Delgado Marquez et al. |
| 9,127,549 B2 | 9/2015 | Lacy et al. |
| 9,133,855 B2 | 9/2015 | Borufka et al. |
| 9,140,137 B2 | 9/2015 | Mayer et al. |
| 9,145,847 B2 | 9/2015 | Gallet et al. |
| 9,169,736 B2 | 10/2015 | Hayford et al. |
| 9,190,892 B2 | 11/2015 | Anthony |
| 9,194,290 B2 | 11/2015 | Suciu et al. |
| 9,206,700 B2 | 12/2015 | Lee et al. |
| 9,222,413 B2 | 12/2015 | Farah et al. |
| 9,239,004 B2 | 1/2016 | Kupratis et al. |
| 9,255,487 B2 | 2/2016 | Mayer et al. |
| 9,255,642 B2 | 2/2016 | Bidkar et al. |
| 9,279,341 B2 | 3/2016 | Durocher et al. |
| 9,279,388 B2 | 3/2016 | Kupratis |
| 9,284,041 B2 | 3/2016 | Belmonte et al. |
| 9,284,887 B2 | 3/2016 | McKenney et al. |
| 9,303,589 B2 | 4/2016 | Heikurinen et al. |
| 9,322,286 B2 | 4/2016 | Digard Brou De Cuissart et al. |
| 9,328,630 B2 | 5/2016 | Brochard et al. |
| 9,333,603 B1 | 5/2016 | Christophel |
| 9,335,051 B2 | 5/2016 | Jarmon et al. |
| 9,341,117 B2 | 5/2016 | Remer et al. |
| 9,346,551 B2 | 5/2016 | Stretton |
| 9,353,647 B2 | 5/2016 | Bordne et al. |
| 9,410,437 B2 | 8/2016 | Paige et al. |
| 9,447,694 B2 | 9/2016 | Sanchez et al. |
| 9,458,729 B2 | 10/2016 | De Wergifosse et al. |
| 9,458,821 B2 | 10/2016 | Jacobsen et al. |
| 9,494,077 B2 | 11/2016 | Chanez et al. |
| 9,512,922 B2 | 12/2016 | Takeuchi et al. |
| 9,517,843 B2 | 12/2016 | Pesyna et al. |
| 9,534,497 B2 | 1/2017 | Kuchana et al. |
| 9,534,608 B2 | 1/2017 | Gehlot et al. |
| 9,567,908 B2 | 2/2017 | Bordne et al. |
| 9,611,788 B2 | 4/2017 | Sidelkovskiy |
| 9,631,558 B2 | 4/2017 | McCune et al. |
| 9,647,367 B1 | 5/2017 | Emaci et al. |
| 9,657,594 B2 | 5/2017 | Klusman |
| 9,670,839 B2 | 6/2017 | Lee et al. |
| 9,701,395 B2 | 7/2017 | Veilleux, Jr. et al. |
| 9,708,982 B2 | 7/2017 | Chouard et al. |
| 9,718,536 B2 | 8/2017 | Danielson et al. |
| 9,726,031 B2 | 8/2017 | Cusack et al. |
| 9,726,186 B2 | 8/2017 | Masson et al. |

(56) References Cited

U.S. PATENT DOCUMENTS

| | | |
|---|---|---|
| 9,765,625 B2 | 9/2017 | Stiehler et al. |
| 9,771,821 B1 | 9/2017 | Mills et al. |
| 9,845,159 B2 | 12/2017 | Suciu et al. |
| 9,868,543 B2 | 1/2018 | Pautis et al. |
| 9,878,798 B2 | 1/2018 | Cedoz |
| 9,915,159 B2 | 3/2018 | Huizenga et al. |
| 9,938,846 B2 | 4/2018 | Freeman et al. |
| 9,951,639 B2 | 4/2018 | Ivakitch et al. |
| 9,951,651 B2 | 4/2018 | Frantz et al. |
| 9,957,895 B2 | 5/2018 | Suciu et al. |
| 10,060,285 B2 | 8/2018 | Do et al. |
| 10,138,809 B2 | 11/2018 | Schwarz et al. |
| 10,161,409 B2 | 12/2018 | Sheridan et al. |
| 10,180,081 B2 | 1/2019 | Bolms et al. |
| 10,294,821 B2 | 5/2019 | Moniz et al. |
| 10,317,085 B2 | 6/2019 | Hannwacker et al. |
| 10,359,117 B2 | 7/2019 | Prenger et al. |
| 10,371,383 B2 | 8/2019 | Reynolds et al. |
| 10,374,477 B2 | 8/2019 | Niergarth et al. |
| 10,378,770 B2 | 8/2019 | Reynolds et al. |
| 10,393,029 B2 | 8/2019 | Tramontin |
| 10,393,381 B2 | 8/2019 | Noe et al. |
| 10,428,826 B2 | 10/2019 | Stein et al. |
| 10,450,897 B2 | 10/2019 | Gallier et al. |
| 10,458,267 B2 | 10/2019 | Gibson et al. |
| 10,465,606 B2 | 11/2019 | Clements et al. |
| 10,488,049 B2 | 11/2019 | Lunel et al. |
| 10,508,546 B2 | 12/2019 | Pankaj et al. |
| 10,519,860 B2 | 12/2019 | Moniz et al. |
| 10,539,020 B2 | 1/2020 | Stuart et al. |
| 10,544,734 B2 | 1/2020 | Stuart et al. |
| 10,544,793 B2 | 1/2020 | Zatorski et al. |
| 10,550,726 B2 | 2/2020 | Moniz et al. |
| 2002/0134070 A1 | 9/2002 | Orlando et al. |
| 2002/0148233 A1 | 10/2002 | Tiemann |
| 2002/0182057 A1 | 12/2002 | Liotta et al. |
| 2003/0000223 A1 | 1/2003 | Conete et al. |
| 2003/0051484 A1 | 3/2003 | Kuo |
| 2003/0061815 A1 | 4/2003 | Young et al. |
| 2003/0070418 A1 | 4/2003 | Eiler et al. |
| 2003/0097844 A1 | 5/2003 | Seda |
| 2003/0152459 A1* | 8/2003 | Gliebe ............ F01D 5/141 415/211.2 |
| 2003/0163983 A1 | 9/2003 | Seda et al. |
| 2003/0163984 A1 | 9/2003 | Seda et al. |
| 2003/0184022 A1 | 10/2003 | Brauer et al. |
| 2003/0185669 A1 | 10/2003 | Brauer et al. |
| 2004/0018081 A1 | 1/2004 | Anderson, Jr. et al. |
| 2004/0020186 A1 | 2/2004 | Orlando et al. |
| 2004/0031260 A1 | 2/2004 | Orlando et al. |
| 2004/0055276 A1 | 3/2004 | John Lewis et al. |
| 2004/0060279 A1 | 4/2004 | Robert Joseph et al. |
| 2004/0067316 A1 | 4/2004 | Gray et al. |
| 2004/0086377 A1 | 5/2004 | Proctor et al. |
| 2004/0100035 A1 | 5/2004 | Trunquist et al. |
| 2004/0120807 A1 | 6/2004 | Albers et al. |
| 2004/0194469 A1 | 10/2004 | Butler et al. |
| 2005/0136767 A1 | 6/2005 | Ivkovich, Jr. et al. |
| 2005/0172610 A1 | 8/2005 | Bart et al. |
| 2005/0199445 A1 | 9/2005 | Zalewski et al. |
| 2005/0221946 A1 | 10/2005 | Mitrovic |
| 2005/0226720 A1 | 10/2005 | Harvey et al. |
| 2005/0241292 A1 | 11/2005 | Taylor et al. |
| 2005/0274846 A1 | 12/2005 | Dun |
| 2006/0005544 A1 | 1/2006 | Herlihy |
| 2006/0010879 A1 | 1/2006 | Aumont et al. |
| 2006/0032210 A1 | 2/2006 | Griffin, III et al. |
| 2006/0064983 A1 | 3/2006 | Currin et al. |
| 2006/0090451 A1 | 5/2006 | Moniz et al. |
| 2006/0093464 A1 | 5/2006 | Moniz et al. |
| 2006/0093465 A1 | 5/2006 | Moniz et al. |
| 2006/0093466 A1 | 5/2006 | Seda et al. |
| 2006/0093467 A1 | 5/2006 | Orlando et al. |
| 2006/0093468 A1 | 5/2006 | Orlando et al. |
| 2006/0093469 A1 | 5/2006 | Moniz et al. |
| 2006/0123797 A1 | 6/2006 | Zborovsky et al. |
| 2006/0133930 A1 | 6/2006 | Aggarwala et al. |
| 2006/0272314 A1 | 12/2006 | Moniz et al. |
| 2006/0275111 A1 | 12/2006 | Orlando et al. |
| 2007/0022738 A1 | 2/2007 | Norris et al. |
| 2007/0025837 A1 | 2/2007 | Pezzetti, Jr. et al. |
| 2007/0059158 A1 | 3/2007 | Alvanos et al. |
| 2007/0081890 A1 | 4/2007 | Lutjen et al. |
| 2007/0122266 A1 | 5/2007 | Cairo et al. |
| 2007/0126292 A1 | 6/2007 | Lugg |
| 2007/0144177 A1 | 6/2007 | Burd |
| 2007/0164516 A1 | 7/2007 | Olsen et al. |
| 2007/0193276 A1 | 8/2007 | Corattiyil et al. |
| 2007/0253809 A1 | 11/2007 | Glynn et al. |
| 2007/0295011 A1 | 12/2007 | Suciu et al. |
| 2008/0018054 A1 | 1/2008 | Herron et al. |
| 2008/0031727 A1 | 2/2008 | Sjogvist |
| 2008/0056895 A1 | 3/2008 | Senoo |
| 2008/0066468 A1 | 3/2008 | Faulder et al. |
| 2008/0098716 A1 | 5/2008 | Orlando et al. |
| 2008/0098717 A1 | 5/2008 | Orlando et al. |
| 2008/0112802 A1 | 5/2008 | Orlando et al. |
| 2008/0131272 A1 | 6/2008 | Wood et al. |
| 2008/0145618 A1 | 6/2008 | Cattaneo et al. |
| 2008/0159851 A1 | 7/2008 | Moniz et al. |
| 2008/0184694 A1 | 8/2008 | Guimbard et al. |
| 2008/0197575 A1 | 8/2008 | El-Aini et al. |
| 2008/0253883 A1 | 10/2008 | Pool et al. |
| 2008/0286107 A1 | 11/2008 | Clemen |
| 2008/0310953 A1 | 12/2008 | Garrison |
| 2009/0022593 A1 | 1/2009 | Oka |
| 2009/0047123 A1 | 2/2009 | Glahn et al. |
| 2009/0051119 A1 | 2/2009 | Glahn et al. |
| 2009/0051120 A1 | 2/2009 | Munsell et al. |
| 2009/0074568 A1 | 3/2009 | Suciu et al. |
| 2009/0085711 A1 | 4/2009 | Iwasaki |
| 2009/0145136 A1 | 6/2009 | Norris et al. |
| 2009/0151317 A1 | 6/2009 | Norris et al. |
| 2009/0169385 A1 | 7/2009 | Suciu et al. |
| 2009/0191045 A1 | 7/2009 | Suciu et al. |
| 2009/0212501 A1 | 8/2009 | Glahn et al. |
| 2009/0308078 A1 | 12/2009 | Foster |
| 2010/0051744 A1 | 3/2010 | Bonnaud et al. |
| 2010/0089019 A1 | 4/2010 | Knight et al. |
| 2010/0115967 A1 | 5/2010 | Maltson |
| 2010/0124495 A1 | 5/2010 | Bifulco |
| 2010/0126141 A1 | 5/2010 | Schilling |
| 2010/0129227 A1 | 5/2010 | Schilling et al. |
| 2010/0132371 A1 | 6/2010 | Durocher et al. |
| 2010/0133835 A1 | 6/2010 | Dooley et al. |
| 2010/0154384 A1 | 6/2010 | Schilling |
| 2010/0162724 A1 | 7/2010 | Myers et al. |
| 2010/0166545 A1 | 7/2010 | Schuler et al. |
| 2010/0194179 A1 | 8/2010 | Waltz |
| 2010/0260591 A1 | 10/2010 | Martin et al. |
| 2010/0310369 A1 | 12/2010 | Perkinson |
| 2010/0326050 A1 | 12/2010 | Schilling et al. |
| 2010/0326078 A1 | 12/2010 | Pieussergues et al. |
| 2011/0048117 A1 | 3/2011 | Kell et al. |
| 2011/0081237 A1 | 4/2011 | Durocher et al. |
| 2011/0120075 A1 | 5/2011 | Diaz et al. |
| 2011/0167835 A1 | 7/2011 | Beutin et al. |
| 2011/0182726 A1 | 7/2011 | McCaffrey |
| 2011/0229311 A1 | 9/2011 | Varanasi et al. |
| 2011/0236200 A1 | 9/2011 | Grover et al. |
| 2011/0238189 A1 | 9/2011 | Butera et al. |
| 2011/0241344 A1 | 10/2011 | Smith et al. |
| 2011/0243735 A1 | 10/2011 | Balk et al. |
| 2011/0271684 A1 | 11/2011 | Corsmeier et al. |
| 2011/0273034 A1 | 11/2011 | Yamamoto |
| 2011/0286834 A1 | 11/2011 | Wardle et al. |
| 2011/0315789 A1 | 12/2011 | Bachman et al. |
| 2012/0009071 A1 | 1/2012 | Tanahashi et al. |
| 2012/0017596 A1 | 1/2012 | Rudrapatna et al. |
| 2012/0039703 A1 | 2/2012 | Swenson et al. |
| 2012/0070292 A1 | 3/2012 | Balk et al. |
| 2012/0073263 A1 | 3/2012 | Kohlenberg et al. |
| 2012/0099987 A1 | 4/2012 | Belmonte et al. |
| 2012/0102735 A1 | 5/2012 | Moreland |

(56) References Cited

U.S. PATENT DOCUMENTS

| | | |
|---|---|---|
| 2012/0117940 A1 | 5/2012 | Winter |
| 2012/0150491 A1* | 6/2012 | Shi .................... G05B 23/0235 702/184 |
| 2012/0177493 A1 | 7/2012 | Fabre |
| 2012/0180886 A1 | 7/2012 | Army et al. |
| 2012/0244001 A1 | 9/2012 | Belmonte et al. |
| 2012/0247121 A1 | 10/2012 | Kitamura et al. |
| 2012/0251290 A1 | 10/2012 | Turnquist et al. |
| 2012/0273617 A1 | 11/2012 | Jensen |
| 2012/0282558 A1 | 11/2012 | Kraemer et al. |
| 2012/0291449 A1 | 11/2012 | Adams et al. |
| 2012/0294717 A1 | 11/2012 | Edwards |
| 2012/0301275 A1 | 11/2012 | Suciu et al. |
| 2012/0321470 A1 | 12/2012 | Udall et al. |
| 2013/0000322 A1 | 1/2013 | Silkowski |
| 2013/0000323 A1 | 1/2013 | Kupratis |
| 2013/0000324 A1 | 1/2013 | Alvanos et al. |
| 2013/0014512 A1 | 1/2013 | Jarmon et al. |
| 2013/0019585 A1 | 1/2013 | Merry et al. |
| 2013/0025257 A1 | 1/2013 | Suciu et al. |
| 2013/0045091 A1 | 2/2013 | Della-Fera et al. |
| 2013/0062463 A1 | 3/2013 | Lord |
| 2013/0067930 A1 | 3/2013 | Paradis |
| 2013/0157037 A1 | 6/2013 | Matsumoto |
| 2013/0192196 A1 | 8/2013 | Suciu et al. |
| 2013/0192200 A1 | 8/2013 | Kupratis et al. |
| 2013/0192263 A1 | 8/2013 | Suciu et al. |
| 2013/0195648 A1* | 8/2013 | Schwarz .................. F02C 7/20 415/229 |
| 2013/0205747 A1 | 8/2013 | Suciu et al. |
| 2013/0205803 A1 | 8/2013 | Xu |
| 2013/0219856 A1 | 8/2013 | Suciu et al. |
| 2013/0219859 A1 | 8/2013 | Suciu et al. |
| 2013/0219860 A1 | 8/2013 | Suciu et al. |
| 2013/0223986 A1 | 8/2013 | Kupratis et al. |
| 2013/0223992 A1 | 8/2013 | Suciu et al. |
| 2013/0223993 A1 | 8/2013 | Merry et al. |
| 2013/0247539 A1 | 9/2013 | Hoppe |
| 2013/0251939 A1 | 9/2013 | Kleinow |
| 2013/0255274 A1 | 10/2013 | Kupratis et al. |
| 2013/0259643 A1 | 10/2013 | Schwarz et al. |
| 2013/0259659 A1 | 10/2013 | Knaul et al. |
| 2013/0259668 A1 | 10/2013 | Myoren et al. |
| 2013/0283802 A1 | 10/2013 | Kim et al. |
| 2013/0285331 A1 | 10/2013 | Kostka et al. |
| 2013/0294908 A1 | 11/2013 | Kuchana et al. |
| 2013/0312425 A1 | 11/2013 | Thorton et al. |
| 2014/0000285 A1 | 1/2014 | Bergman et al. |
| 2014/0017086 A1 | 1/2014 | Charier et al. |
| 2014/0026580 A1 | 1/2014 | Pardington et al. |
| 2014/0034779 A1 | 2/2014 | Fenny |
| 2014/0083116 A1 | 3/2014 | Crites et al. |
| 2014/0119912 A1 | 5/2014 | Bidkar et al. |
| 2014/0127457 A1 | 5/2014 | Hillier |
| 2014/0150401 A1 | 6/2014 | Venter |
| 2014/0157754 A1 | 6/2014 | Hasel et al. |
| 2014/0157792 A1 | 6/2014 | Itzel et al. |
| 2014/0169953 A1 | 6/2014 | Maguire |
| 2014/0174056 A1 | 6/2014 | Suciu et al. |
| 2014/0174858 A1 | 6/2014 | Remer et al. |
| 2014/0182972 A1 | 7/2014 | Hetherington et al. |
| 2014/0190171 A1 | 7/2014 | Critchley et al. |
| 2014/0193238 A1 | 7/2014 | Sheridan et al. |
| 2014/0206496 A1 | 7/2014 | McCune et al. |
| 2014/0227088 A1 | 8/2014 | Beaujard et al. |
| 2014/0230443 A1 | 8/2014 | Plante et al. |
| 2014/0241856 A1 | 8/2014 | Roberge et al. |
| 2014/0261986 A1 | 9/2014 | Lazur et al. |
| 2014/0271144 A1 | 9/2014 | Landwehr et al. |
| 2014/0283501 A1 | 9/2014 | Schwarz et al. |
| 2014/0286754 A1 | 9/2014 | Schwarz et al. |
| 2014/0290209 A1 | 10/2014 | Lee et al. |
| 2014/0294585 A1 | 10/2014 | Escure et al. |
| 2014/0301858 A1 | 10/2014 | Lin et al. |
| 2014/0311152 A1 | 10/2014 | Prociw et al. |
| 2014/0338336 A1 | 11/2014 | Cunha et al. |
| 2014/0348664 A1 | 11/2014 | Jan et al. |
| 2014/0363270 A1 | 12/2014 | Feldmann et al. |
| 2014/0363276 A1 | 12/2014 | Vetters et al. |
| 2015/0001812 A1 | 1/2015 | Stefanis et al. |
| 2015/0003970 A1 | 1/2015 | Feldmann et al. |
| 2015/0003978 A1 | 1/2015 | Watanabe |
| 2015/0027101 A1 | 1/2015 | Hasel |
| 2015/0044018 A1 | 2/2015 | Dierksmeier |
| 2015/0078888 A1 | 3/2015 | Golshany et al. |
| 2015/0089958 A1 | 4/2015 | Suciu et al. |
| 2015/0096303 A1 | 4/2015 | Schwarz et al. |
| 2015/0107109 A1 | 4/2015 | Corsmeier et al. |
| 2015/0114002 A1 | 4/2015 | Schwarz et al. |
| 2015/0125293 A1 | 5/2015 | Sheridan et al. |
| 2015/0130138 A1 | 5/2015 | Zheng et al. |
| 2015/0142219 A1 | 5/2015 | Sonneborn |
| 2015/0147178 A1 | 5/2015 | Frantz et al. |
| 2015/0152783 A1 | 6/2015 | Acquisti |
| 2015/0159500 A1 | 6/2015 | Carlucci et al. |
| 2015/0198380 A1 | 7/2015 | Haj-Hariri et al. |
| 2015/0204447 A1 | 7/2015 | Kloepfer |
| 2015/0225087 A1 | 8/2015 | Tanaka et al. |
| 2015/0226075 A1 | 8/2015 | Aoki et al. |
| 2015/0226125 A1 | 8/2015 | Petty et al. |
| 2015/0233298 A1 | 8/2015 | Baltas |
| 2015/0239568 A1 | 8/2015 | Gukeisen |
| 2015/0240643 A1 | 8/2015 | Guemmer |
| 2015/0252752 A1 | 9/2015 | Suciu |
| 2015/0260404 A1 | 9/2015 | Sullivan |
| 2015/0284071 A1 | 10/2015 | Veilleux, Jr. et al. |
| 2015/0292402 A1 | 10/2015 | Razak |
| 2015/0308343 A1 | 10/2015 | Scott et al. |
| 2015/0308344 A1 | 10/2015 | Vo et al. |
| 2015/0308351 A1 | 10/2015 | Sheridan |
| 2015/0321766 A1 | 11/2015 | Howe et al. |
| 2015/0322815 A1 | 11/2015 | Scott |
| 2015/0330249 A1 | 11/2015 | Budnick |
| 2015/0330250 A1 | 11/2015 | Scott et al. |
| 2015/0337677 A1 | 11/2015 | Roberge |
| 2015/0337682 A1 | 11/2015 | Yeager et al. |
| 2015/0345330 A1 | 12/2015 | Budnick et al. |
| 2015/0345392 A1 | 12/2015 | Merry et al. |
| 2015/0345404 A1 | 12/2015 | Adams et al. |
| 2015/0345426 A1 | 12/2015 | Houston et al. |
| 2015/0354410 A1 | 12/2015 | Budnick et al. |
| 2015/0354502 A1 | 12/2015 | Kuhne et al. |
| 2015/0361814 A1 | 12/2015 | Bluck et al. |
| 2015/0369046 A1 | 12/2015 | Roberge |
| 2016/0001873 A1 | 1/2016 | Schwarz |
| 2016/0006226 A1 | 1/2016 | Moisei et al. |
| 2016/0010589 A1 | 1/2016 | Rolt |
| 2016/0017754 A1 | 1/2016 | Kumar |
| 2016/0023275 A1 | 1/2016 | Propheter-Hinckley et al. |
| 2016/0025003 A1 | 1/2016 | Schwarz et al. |
| 2016/0032775 A1 | 2/2016 | Wang et al. |
| 2016/0033236 A1 | 2/2016 | Meldner et al. |
| 2016/0061052 A1 | 3/2016 | Suciu et al. |
| 2016/0061057 A1 | 3/2016 | Lord et al. |
| 2016/0061113 A1 | 3/2016 | Romanov et al. |
| 2016/0061451 A1 | 3/2016 | Dudebout et al. |
| 2016/0069260 A1 | 3/2016 | Speak et al. |
| 2016/0076451 A1 | 3/2016 | McBrien et al. |
| 2016/0084265 A1 | 3/2016 | Yu et al. |
| 2016/0084501 A1 | 3/2016 | Lunel et al. |
| 2016/0090849 A1 | 3/2016 | Robertson et al. |
| 2016/0102574 A1 | 4/2016 | Peters |
| 2016/0102607 A1 | 4/2016 | Hiernaux |
| 2016/0108757 A1 | 4/2016 | Mickelsen et al. |
| 2016/0108814 A1 | 4/2016 | Schmitz |
| 2016/0114894 A1 | 4/2016 | Schwarz et al. |
| 2016/0115805 A1 | 4/2016 | Gibson et al. |
| 2016/0123156 A1 | 5/2016 | Hucker et al. |
| 2016/0123187 A1 | 5/2016 | Leslie et al. |
| 2016/0130009 A9 | 5/2016 | Pautis et al. |
| 2016/0130980 A1 | 5/2016 | McKenney et al. |
| 2016/0131084 A1 | 5/2016 | Kupratis et al. |
| 2016/0149469 A1 | 5/2016 | Lemmers et al. |
| 2016/0160670 A1 | 6/2016 | Aggarwala |

(56) References Cited

U.S. PATENT DOCUMENTS

| | | |
|---|---|---|
| 2016/0160681 A1 | 6/2016 | Roach et al. |
| 2016/0160800 A1 | 6/2016 | Knowles et al. |
| 2016/0169044 A1 | 6/2016 | Clarkson et al. |
| 2016/0186578 A1* | 6/2016 | Suciu .................. F01D 5/02 416/241 R |
| 2016/0186688 A1 | 6/2016 | Mears et al. |
| 2016/0195010 A1 | 7/2016 | Roberge |
| 2016/0195019 A1 | 7/2016 | Roberge |
| 2016/0201474 A1 | 7/2016 | Slavens et al. |
| 2016/0201490 A1 | 7/2016 | Scott |
| 2016/0201510 A1 | 7/2016 | Roach et al. |
| 2016/0201515 A1 | 7/2016 | Chang |
| 2016/0201568 A1 | 7/2016 | Sheridan et al. |
| 2016/0201569 A1 | 7/2016 | Schwarz et al. |
| 2016/0201570 A1 | 7/2016 | Schwarz et al. |
| 2016/0201579 A1 | 7/2016 | Scheu et al. |
| 2016/0201606 A1 | 7/2016 | Suciu |
| 2016/0201607 A1 | 7/2016 | Gallagher et al. |
| 2016/0208699 A1 | 7/2016 | Cherolis et al. |
| 2016/0208700 A1 | 7/2016 | Minnear et al. |
| 2016/0214727 A1 | 7/2016 | Hamel et al. |
| 2016/0222807 A1 | 8/2016 | Liebl et al. |
| 2016/0222814 A1 | 8/2016 | Sheridan |
| 2016/0222975 A1 | 8/2016 | Sheridan et al. |
| 2016/0226326 A1 | 8/2016 | Gotschmann et al. |
| 2016/0230604 A1 | 8/2016 | Light et al. |
| 2016/0238022 A1 | 8/2016 | Heikurinen et al. |
| 2016/0241096 A1 | 8/2016 | Mueller |
| 2016/0243719 A1 | 8/2016 | Ohshima et al. |
| 2016/0265430 A1 | 9/2016 | Schwarz |
| 2016/0281611 A1 | 9/2016 | Stockwell |
| 2016/0290169 A1 | 10/2016 | Karafillis et al. |
| 2016/0294237 A1 | 10/2016 | Bouaroudj et al. |
| 2016/0298539 A1 | 10/2016 | Roberge |
| 2016/0305281 A1 | 10/2016 | Ballard, Jr. et al. |
| 2016/0312799 A1 | 10/2016 | Yu |
| 2016/0333734 A1 | 11/2016 | Dowden et al. |
| 2016/0341070 A1 | 11/2016 | Garcia et al. |
| 2016/0356225 A1 | 12/2016 | Sheridan |
| 2016/0359394 A1 | 12/2016 | Zheng et al. |
| 2016/0368363 A1 | 12/2016 | Petersen et al. |
| 2016/0369702 A1 | 12/2016 | Otto et al. |
| 2016/0376997 A1 | 12/2016 | Prociw |
| 2017/0002674 A1 | 1/2017 | Vetters et al. |
| 2017/0022837 A1 | 1/2017 | Tran et al. |
| 2017/0047807 A1 | 2/2017 | Manz et al. |
| 2017/0051834 A1 | 2/2017 | Webster et al. |
| 2017/0058786 A1 | 3/2017 | Stockwell |
| 2017/0066525 A1 | 3/2017 | Tomaszewicz |
| 2017/0096238 A1 | 4/2017 | Porte et al. |
| 2017/0107837 A1 | 4/2017 | Huizenga et al. |
| 2017/0107839 A1 | 4/2017 | Glahn et al. |
| 2017/0126087 A1 | 5/2017 | Soderberg |
| 2017/0130610 A1 | 5/2017 | Nanda et al. |
| 2017/0137135 A1 | 5/2017 | Chanez et al. |
| 2017/0137136 A1 | 5/2017 | Beutin |
| 2017/0155307 A1 | 6/2017 | Hayslett et al. |
| 2017/0175751 A1 | 6/2017 | Moniz et al. |
| 2017/0198605 A1 | 7/2017 | Vielcanet et al. |
| 2017/0211484 A1 | 7/2017 | Sheridan |
| 2017/0211486 A1 | 7/2017 | Rowe et al. |
| 2017/0226861 A1 | 8/2017 | Evain et al. |
| 2017/0234134 A1 | 8/2017 | Bunker |
| 2017/0248028 A1 | 8/2017 | Schilling |
| 2017/0248320 A1 | 8/2017 | Hannwacker et al. |
| 2017/0274992 A1 | 9/2017 | Chretien |
| 2017/0283032 A1 | 10/2017 | Jodet et al. |
| 2017/0292227 A1 | 10/2017 | Kim |
| 2017/0297727 A1 | 10/2017 | Niergarth et al. |
| 2017/0297728 A1 | 10/2017 | Niergarth et al. |
| 2017/0298816 A1 | 10/2017 | Razak et al. |
| 2017/0302116 A1 | 10/2017 | Oshida et al. |
| 2017/0342851 A1 | 11/2017 | Narasimharao et al. |
| 2017/0370583 A1 | 12/2017 | Marusko et al. |
| 2018/0016924 A1 | 1/2018 | Gallier et al. |
| 2018/0045073 A1 | 2/2018 | Wiedenhoefer et al. |
| 2018/0051706 A1 | 2/2018 | DiBenedetto |
| 2018/0072423 A1 | 3/2018 | Velez De Mendizabal Alonso et al. |
| 2018/0087396 A1 | 3/2018 | van der Merwe et al. |
| 2018/0127103 A1 | 5/2018 | Cantemir |
| 2018/0162541 A1 | 6/2018 | Jasklowski et al. |
| 2018/0163627 A1 | 6/2018 | Suciu et al. |
| 2018/0209273 A1 | 7/2018 | Moniz et al. |
| 2018/0209274 A1 | 7/2018 | Zatorski et al. |
| 2018/0209335 A1 | 7/2018 | Stuart et al. |
| 2018/0209336 A1 | 7/2018 | Stuart et al. |
| 2018/0209350 A1 | 7/2018 | Kupratis et al. |
| 2018/0216575 A1 | 8/2018 | Miller et al. |
| 2018/0216822 A1 | 8/2018 | Noe et al. |
| 2018/0216823 A1 | 8/2018 | Reynolds et al. |
| 2018/0216824 A1 | 8/2018 | Reynolds et al. |
| 2018/0223732 A1 | 8/2018 | Clements et al. |
| 2018/0230805 A1 | 8/2018 | Miller et al. |
| 2018/0237120 A1 | 8/2018 | Miller et al. |
| 2018/0238186 A1 | 8/2018 | Miller et al. |
| 2018/0252317 A1 | 9/2018 | Prenger et al. |
| 2018/0274365 A1 | 9/2018 | Stuart et al. |
| 2018/0320632 A1 | 11/2018 | Clements et al. |
| 2018/0320633 A1 | 11/2018 | Moniz et al. |
| 2018/0328287 A1 | 11/2018 | Moniz et al. |
| 2018/0340423 A1 | 11/2018 | Stuart et al. |
| 2018/0340446 A1 | 11/2018 | Stuart et al. |
| 2018/0340469 A1 | 11/2018 | Stuart et al. |
| 2018/0340470 A1 | 11/2018 | Stuart et al. |
| 2018/0355802 A1 | 12/2018 | Sheridan |
| 2018/0355804 A1 | 12/2018 | Miller et al. |
| 2018/0355951 A1 | 12/2018 | Stuart et al. |
| 2018/0356095 A1 | 12/2018 | Patel et al. |
| 2018/0363554 A1 | 12/2018 | Kroger et al. |
| 2018/0363675 A1 | 12/2018 | Kroger et al. |
| 2018/0363676 A1 | 12/2018 | Kroger et al. |
| 2018/0363677 A1 | 12/2018 | Kroger et al. |
| 2018/0363678 A1 | 12/2018 | Kroger et al. |
| 2019/0017382 A1 | 1/2019 | Clements et al. |
| 2019/0055856 A1 | 2/2019 | Barow et al. |
| 2019/0085698 A1 | 3/2019 | van der Merwe et al. |
| 2019/0085701 A1 | 3/2019 | Pankaj et al. |
| 2019/0085702 A1 | 3/2019 | Pankaj et al. |
| 2019/0085710 A1 | 3/2019 | van der Merwe et al. |
| 2019/0085711 A1 | 3/2019 | Gibson et al. |
| 2019/0085712 A1 | 3/2019 | Wesling et al. |
| 2019/0085714 A1 | 3/2019 | Zatorski et al. |
| 2019/0085715 A1 | 3/2019 | van der Merwe et al. |
| 2019/0085716 A1 | 3/2019 | Pankaj et al. |
| 2019/0085720 A1 | 3/2019 | Pankaj et al. |
| 2019/0085721 A1 | 3/2019 | Pankaj et al. |
| 2019/0085722 A1 | 3/2019 | Pankaj et al. |
| 2019/0085723 A1 | 3/2019 | Pankaj et al. |
| 2019/0085725 A1 | 3/2019 | Zatorski et al. |
| 2019/0085766 A1 | 3/2019 | Clements et al. |
| 2019/0093489 A1 | 3/2019 | Mondal et al. |
| 2019/0093496 A1 | 3/2019 | Hardikar et al. |
| 2019/0128137 A1 | 5/2019 | Wesling et al. |
| 2020/0040769 A1 | 2/2020 | Gallier et al. |
| 2020/0200082 A1* | 6/2020 | Mondal .................. F02C 3/067 |

FOREIGN PATENT DOCUMENTS

| | | |
|---|---|---|
| DE | 3933776 A1 | 4/1991 |
| DE | 4214483 A1 | 11/1993 |
| EP | 1340902 A2 | 9/2003 |
| EP | 1533473 A1 | 5/2005 |
| EP | 1653045 A2 | 5/2006 |
| EP | 1790833 | 5/2007 |
| EP | 1881176 A2 | 1/2008 |
| EP | 2020542 A1 | 4/2009 |
| EP | 2128419 A1 | 12/2009 |
| EP | 2466074 | 6/2012 |
| EP | 2728140 A2 | 5/2014 |
| EP | 3112613 A1 | 1/2017 |
| FR | 900378 A | 6/1945 |
| FR | 2825778 A1 | 12/2002 |
| FR | 2867244 | 9/2005 |

(56) References Cited

FOREIGN PATENT DOCUMENTS

| | | |
|---|---|---|
| FR | 2935465 A1 | 3/2010 |
| FR | 3027468 A1 | 4/2016 |
| GB | 544909 A | 5/1942 |
| GB | 559756 A | 3/1944 |
| GB | 572859 A | 10/1945 |
| GB | 586563 A | 3/1947 |
| GB | 586569 A | 3/1947 |
| GB | 594206 | 11/1947 |
| GB | 856561 A | 12/1960 |
| GB | 1097632 A | 1/1968 |
| GB | 1204321 A | 9/1970 |
| GB | 2151714 A | 7/1985 |
| GB | 2215290 A | 9/1989 |
| GB | 2225297 A | 5/1990 |
| GB | 2372157 A | 8/2002 |
| GB | 2492882 A | 1/2013 |
| GB | 2493980 A | 2/2013 |
| JP | S51127914 A | 11/1976 |
| JP | S61226502 A | 10/1986 |
| JP | H01229799 A | 9/1989 |
| JP | 2007/247406 A | 9/2007 |
| JP | 2008/278590 A | 11/2008 |
| JP | 2012/512360 A | 5/2012 |
| JP | 2012/512987 A | 6/2012 |
| RU | 2534684 C1 | 12/2014 |
| WO | WO97/17255 A1 | 5/1997 |
| WO | WO2003/080430 A1 | 10/2003 |
| WO | WO2008/044973 A1 | 4/2008 |
| WO | WO2013/150198 A1 | 10/2013 |
| WO | WO2014/022150 A1 | 2/2014 |
| WO | WO2015/102779 A1 | 4/2015 |
| WO | WO2017/180682 A1 | 10/2017 |

OTHER PUBLICATIONS

Edkins et al., TF34 Turbofan Quiet Engine Study, NASA CR-120914, 99 Pages.

Gunston, Jane's Aero-Engines, Issue 17, General Electric TF39, Mar. 2005, 3 Pages.

Gunston, Jane's Aero-Engines, Issue 7, Mar. 2000, 5 Pages.

Hill et al., Mechanics and Thermodynamics of Propulsion, 1992, Addison-Wesley Publishing Company, 2nd Edition, Axial Turbines, Chapter 8, p. 378 & 370, 1 Page.

Hwang et al., Advanced Seals for Engine Secondary Flowpath, Journal of Propulsion and Power, American Institute of Aeronautics and Astronautics, vol. 12, No. 4, Jul.-Aug. 1996, pp. 794-799.

Kandebo et al., "Geared-Turbofan Engine Design Targets Cost, Complexity", Aviation Week and Space Technology, McGraw-Hill Compagny, New York, NY, US, vol. 148, No. 8, Feb. 23, 1998, pp. 34-35, XP008174450.

Mattingly et al., Aircraft Engine Design, 2002, American Institute of Aeronautics and Astronautics, 2nd Edition, 4 Pages.

Pratt & Whitney, PurePower Engine Family Specs Chart, 9 Pages. http://www.pw.utc.com/Content/PurePowerPW1000G_Engine/pdf/B-11_PurePowerEngineFamily_SpecsChart.pdf.

\* cited by examiner

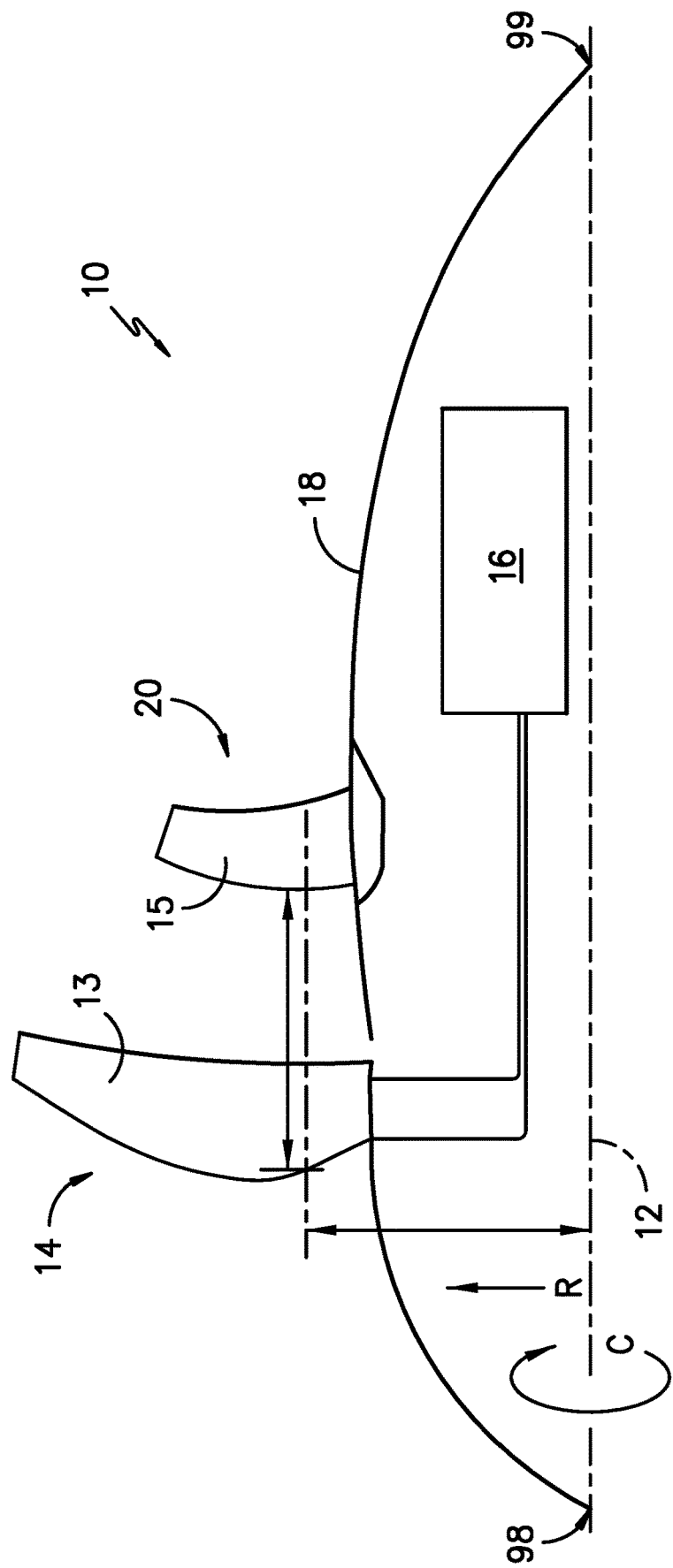
FIG. -1-

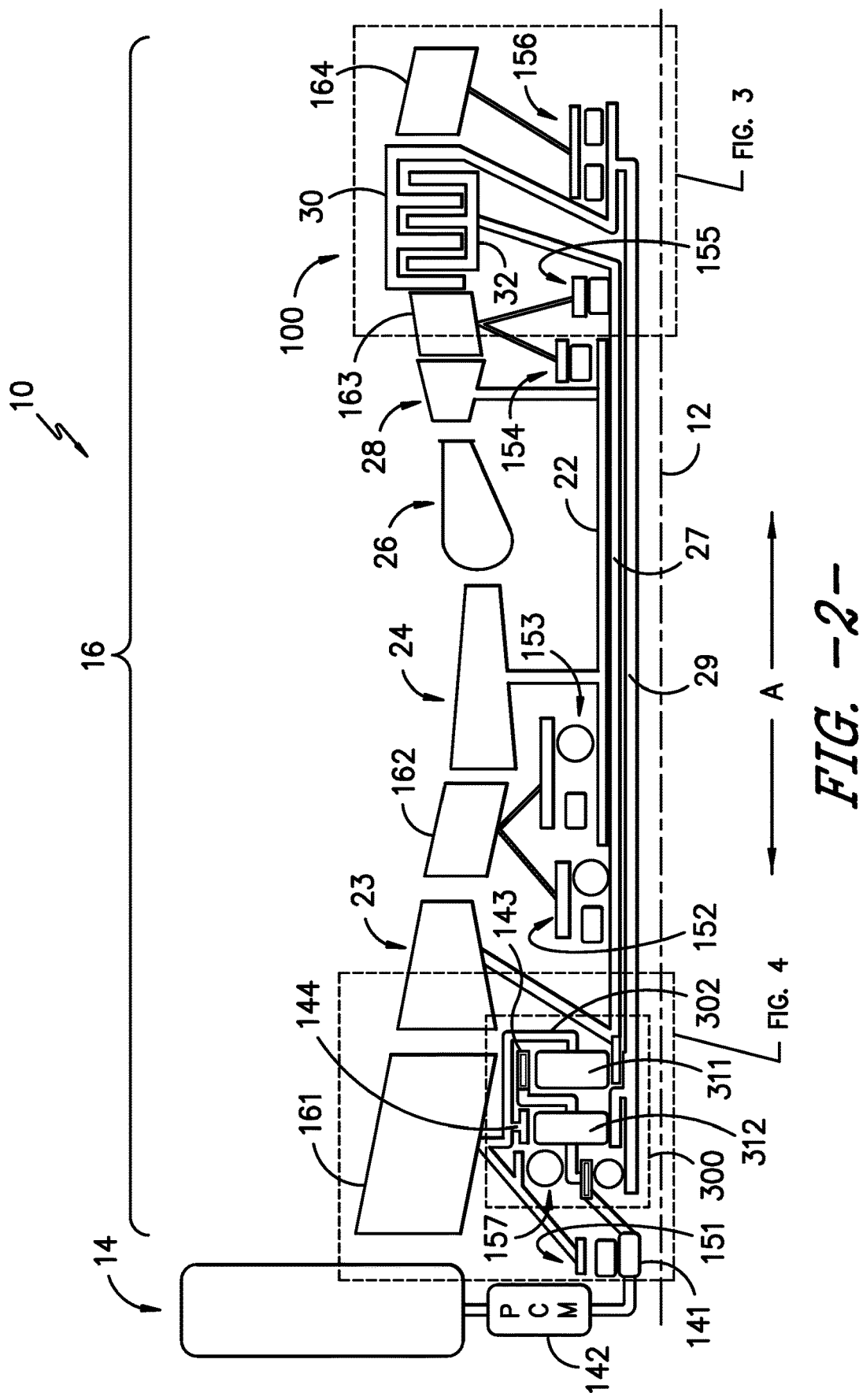
FIG. -2-

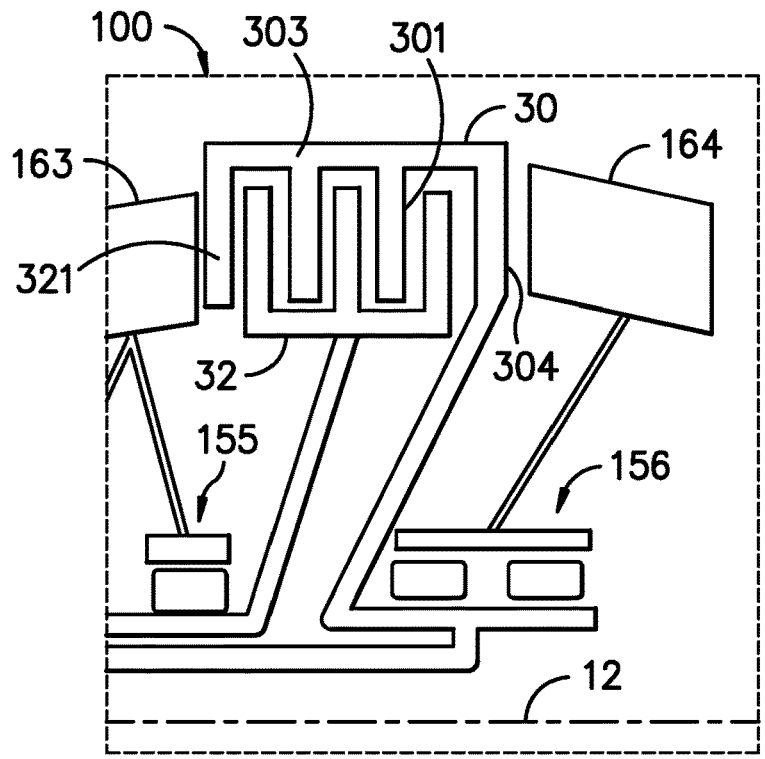
FIG. -3-
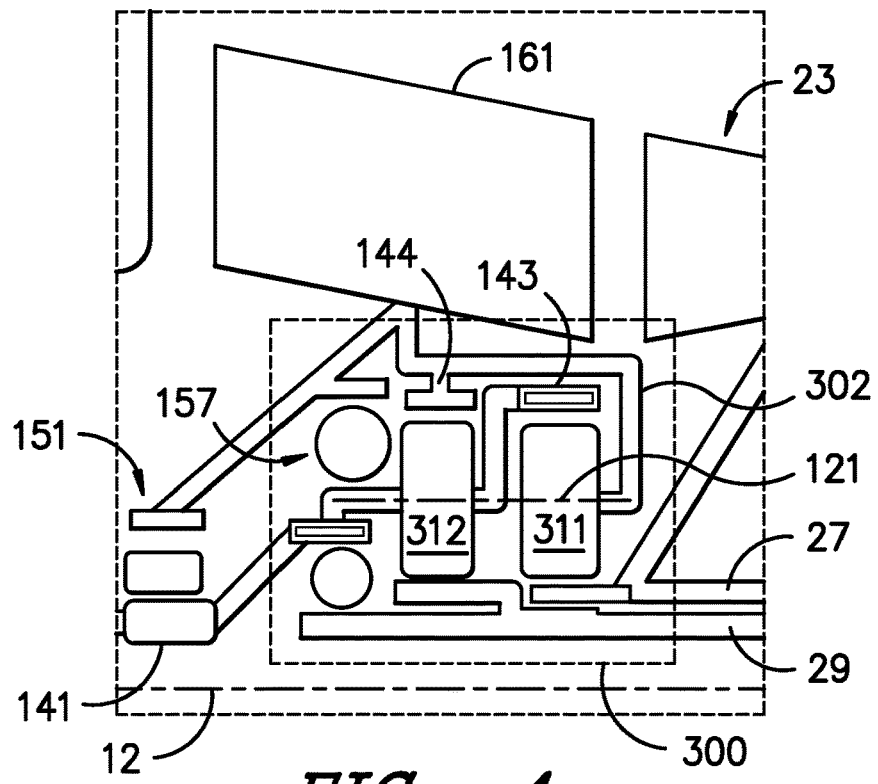
FIG. -4-

GAS TURBINE ENGINE WITH INTERDIGITATED TURBINE AND GEAR ASSEMBLY

FIELD

The present subject matter relates generally to gas turbine engines with interdigitated turbines and gear assemblies.

BACKGROUND

Gas turbine engines are challenged to achieve ever-greater efficiencies and improved fuel consumption. The overall propulsive efficiency and fuel consumption of a gas turbine engine is dependent on different factors, such as engine design, the performance and interaction of systems that form the engine, and performance debits from each system to generate thrust by a fan section.

For example, when a fan rotates at high speed, the flow of air may have discontinuities, shocks, turbulence, and interactions that result in undesired noise, propulsive losses, and other inefficiencies. Multiple fan rotor assemblies may further induce interaction noises between flows of air from several fan rotors. Noise generation may particularly limit certain engine architectures, such as open rotor engines, from usage, such as due to increasingly stringent noise regulations for commercial aircraft.

Reduction gear assemblies may allow reduced fan rotational speed while allowing for a conventional turbine rotor assembly to operate more efficiently at relatively high speeds. While gear assemblies may allow for efficiencies between the fan and conventional turbine, known gear assemblies may adversely increase engine diameter and weight. Such increases in diameter may particularly limit engine and fan diameter due to ground clearance limits for commercial aircraft.

Furthermore, interdigitated rotor assemblies may improve aerodynamic performance at an engine. However, interdigitated rotors are challenged with adverse rotor dynamics, such as rotor balancing, rotor whirl, vibrational modes, and other adverse operating conditions not found to a similar extent as conventional non-interdigitated rotor assemblies. Such issues may generally limit the rotational speed at which an interdigitated rotor may operate in comparison to conventional rotor assemblies. As such, it should be appreciated that interdigitated turbines may not interchange with conventional non-interdigitated turbines with predictable results, such as due to rotor dynamics issues arising from overhanging or cantilevered rotors, or adversely decreased turbine speed compared to fan speed and gear assembly speed reduction and weight. For example, substitution of conventional rotors with interdigitated rotors may offer improved aerodynamic performance but adversely affect overall engine performance due to decreased gear assembly efficiency, as the decreased rotor speed may cause the added weight and complexity of the gear assembly to have too great of a performance debit compared to its efficiency improvements from reduced fan speed.

While improvements in various engine systems may separately offer improvements in propulsive efficiency, fuel burn, bypass ratio, or thrust output, issues and incompatibilities arise when certain systems are combined with one another. As such, there is a need for a gas turbine engine that may integrate improved systems and overcome performance debits with regard to certain combinations of systems to produce improved thrust output, reduced noise generation, improved fuel consumption.

BRIEF DESCRIPTION

Aspects and advantages of the invention will be set forth in part in the following description, or may be obvious from the description, or may be learned through practice of the invention.

A gas turbine engine having an interdigitated turbine assembly including a first turbine rotor and a second turbine rotor, wherein a total number of stages at the interdigitated turbine assembly is between 3 and 8, and an average stage pressure ratio at the interdigitated turbine assembly is between 1.3 and 1.9. A gear assembly is configured to receive power from the interdigitated turbine assembly, and a fan assembly is configured to receive power from the gear assembly. The interdigitated turbine assembly and the gear assembly are together configured to allow the second turbine rotor to rotate at a second rotational speed greater than a first rotational speed at the first turbine rotor. The fan assembly and the gear assembly are together configured to allow the fan assembly to rotate at a third rotational speed less than the first rotational speed and the second rotational speed. The interdigitated turbine assembly, the gear assembly, and the fan assembly together have a maximum $AN^2$ at the second turbine rotor between 30 and 90.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cutaway side view of an exemplary embodiment of a turbomachine engine including a core engine with a gear assembly according to an aspect of the present disclosure;

FIG. 2 is an exemplary schematic embodiment of the engine of FIG. 1 according to an aspect the present disclosure;

FIG. 3 is a detailed view of a portion of the exemplary schematic embodiment of FIG. 2; and FIG. 4 is a detailed view of a portion of the exemplary schematic embodiment of FIG. 2.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of gears, housings, conduits, heat exchangers, or other gear assembly components having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

As used herein, "average stage pressure ratio" is defined as total pressure ratio at a specified rotor assembly taken to a power of an inverse of the total number of stages of the specified rotor assembly.

As used herein, "$AN^2$" is an annular flowpath area in square inches at the trailing edge of a specified rotor multiplied by a square of rotational speed in revolutions per minute (RPM) multiplied by $10^{-9}$. "Max $AN^2$" refers to an annular flowpath area at the trailing edge of a last or aft-most stage of a specified rotor assembly multiplied by a square of maximum rotational speed in RPM of the specified rotor assembly multiplied by $10^{-9}$.

Referring now to the drawings, FIG. 1 is an exemplary embodiment of an engine 10 including an interdigitated turbine assembly according to aspects of the present disclosure. The engine 10 includes a fan assembly 14 driven by a core engine 16. The core engine 16 is encased in an outer casing 18. In various embodiments, the core engine 16 is a Brayton cycle system configured to drive the fan assembly 14. The core engine 16 is shrouded, at least in part, by an outer casing 18. The fan assembly 14 includes a plurality of fan blades 13. A vane assembly 20 is extended from the outer casing 18. The vane assembly 20 including a plurality of vanes 15 is positioned in operable arrangement with the fan blades 13 to provide thrust, control thrust vector, abate or re-direct undesired acoustic noise, or otherwise desirably alter a flow of air relative to the fan blades 13.

In certain embodiments, such as depicted in FIG. 1, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13, such as to control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above.

In certain embodiments, such as depicted in FIG. 1, the engine 10 is an un-ducted thrust producing system, such that the plurality of fan blades 13 is unshrouded by a nacelle or fan casing. As such, in various embodiments, the engine 10 may be configured as an unshrouded turbofan engine, an open rotor engine, or a propfan engine. In particular embodiments, the engine 10 is a single unducted rotor engine including a single row of fan blades 13. The engine 10 configured as an open rotor engine includes the fan assembly 14 having large-diameter fan blades 13, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally high cruise speed than aircraft with turboprop engines), and/or relatively low rotational speeds. Cruise altitude is generally an altitude at which an aircraft levels after climb and prior to descending to an approach flight phase.

It should be appreciated that various embodiments of the engine 10 depicted and described herein may allow for normal subsonic aircraft cruise altitude operation at or above Mach 0.5. In certain embodiments, the engine 10 allows for normal aircraft operation between Mach 0.55 and Mach 0.85 at cruise altitude. In still particular embodiments, the engine 10 allows for normal aircraft operation between Mach 0.75 and Mach 0.85. In certain embodiments, the engine 10 allows for fan assembly 14 blade tip rotational speeds at or less than 750 feet per second (fps).

Referring now to FIG. 2, a schematic embodiment of the engine 10 is provided. The fan assembly 14 includes an output shaft assembly 141 connected to a gear assembly 300. In certain embodiments, the fan assembly 14 includes a fan or propeller pitch control mechanism 142 configured to adjust pitch of one or more of the fan blades 13 (FIG. 1). The output shaft assembly 141 receives power and torque from the core engine 16 through the gear assembly 300 such as further described herein.

The core engine 16 includes a compressor section, a heat addition system 26, and a turbine section together in serial flow arrangement. The core engine 16 is extended circumferentially relative to an engine centerline axis 12. However, it should be appreciated that portions of the engine 10, such as an inlet end or an outlet end, may extend two-dimensionally. The compressor section includes a high-speed compressor 24 in serial flow arrangement downstream of a relatively low-speed compressor 23. The turbine section includes a high-speed turbine 28 in serial flow arrangement upstream of a relatively slower interdigitated turbine assembly 100. The core engine 16 includes a high-speed spool that includes the high-speed compressor 24 and the high-speed turbine 28 operably rotatably coupled together by a high-speed shaft 22. The heat addition system 26 is positioned between the high-speed compressor 24 and the high-speed turbine 28. Various embodiments of the heat addition system 26 include a combustion section. The combustion section may be configured as a deflagrative combustion section, a rotating detonation combustion section, a pulse detonation combustion section, or other appropriate heat addition system. The heat addition system 26 may be configured as one or more of a rich-burn system or a lean-burn system, or combinations thereof. In still various embodiments, the heat addition system 26 includes an annular combustor, a can combustor, a cannular combustor, a trapped vortex combustor (TVC), or other appropriate combustion system, or combinations thereof.

Referring still to FIG. 2, the core engine 16 includes the booster or low-speed compressor 23 positioned in flow relationship with the high-speed compressor 24. The low-speed compressor 23 is rotatably coupled with a first turbine rotor 32 via a first shaft 27. The interdigitated turbine assembly 100 includes the first turbine rotor 32 in vaneless successive alternating arrangement with a second turbine rotor 30, such as via a rotating outer shroud, drum, casing, or rotor. The first turbine rotor 32 and the second turbine rotor 30 are each operably connected to the gear assembly 300 to provide power to the fan assembly 14 and the low-speed compressor 23, such as described further herein. In certain embodiments, the first turbine rotor 32 and the second turbine rotor 30 are together positioned downstream of the high-speed turbine 28.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

Certain embodiments of the gear assembly 300 depicted and described herein allow for gear ratios and arrangements providing for proportional rotational speed of the fan assembly 14 relative to the turbine section 33. Various embodiments of the gear assembly 300 provided herein may include overall gear ratios of up to 14:1. Still various embodiments of the gear assembly provided herein may include overall gear ratios greater than 1:1. In a particular embodiment, such as further described herein, the gear assembly 300 is a two-stage parallel planetary-star gear assembly.

Although depicted as an un-shrouded or open rotor engine, it should be appreciated that aspects of the disclosure provided herein may be applied to shrouded or ducted engines, partially ducted engines, aft-fan engines, or other turbomachine configurations, including those for marine, industrial, or aero-propulsion systems. Certain aspects of the disclosure may be applicable to turbofan, turboprop, or turboshaft engines, such as turbofan, turboprop, or turboshaft engines with reduction gear assemblies.

Referring still to FIG. 2, and further detailed in FIG. 3, the first turbine rotor 32 includes a plurality of first rotors 321 extended outward along a radial direction R (FIG. 2) relative to the engine centerline axis 12. The first rotor 321 may be formed as a bladed disk or integrally bladed rotor, or as a blade-and-disk assembly including separable blades attached to a disk, drum or rotor.

The second turbine rotor 30 includes a plurality of second rotor blades 301 extended inward along the radial direction from a rotatable drum 303. The rotatable drum 303 is extended along an axial direction A (FIG. 2) and positioned outward along the radial direction of the first turbine rotor 32 and the second turbine rotor 30. The rotatable drum 303 provides support and fixture to the second rotor blades 301. Although not further depicted, the first turbine rotor 32 and/or the second turbine rotor 30 may include seals, shims, fasteners, or other components for attaching blades onto a disk, drum, rotor, or similar structure, or further for reducing undesired flow leakages or providing desired thermal responses. The second turbine rotor 30 may further include a rotatable frame 304 configured to provide structural support for the rotatable drum and second rotor blades. In certain embodiments, the rotatable drum 303 is cantilevered from the rotatable frame 304.

Referring back to FIG. 2, the engine 10 includes a plurality of bearing assemblies positioned to allow for rotation and thrust compensation of the rotor assemblies. In certain embodiments, the engine 10 includes a first bearing assembly 151 positioned at the fan assembly 14. A second bearing assembly 152 is positioned at the low-speed spool proximate to the low-speed compressor 23 and the first shaft 27. A third bearing assembly 153 is positioned at the high-speed spool proximate to the high-speed compressor 24 and the high-speed shaft 22. A fourth bearing assembly 154 is positioned at the high-speed spool proximate to the high-speed turbine 28 and the high-speed shaft 22. A fifth bearing assembly 155 is positioned at the low-speed spool proximate to the first shaft 27 and the first turbine rotor 32. A sixth bearing assembly 156 is positioned at a mid-speed spool proximate to the second shaft 29 and the second turbine rotor 30.

The engine 10 includes a plurality of static frames positioned to support the rotor assemblies and bearing assemblies. The static frame may further be configured to supply and scavenge lubricant and damper fluid to one or more bearing assemblies and store and position instrumentation and sensors. A first frame 161 is positioned in serial flow arrangement between the fan assembly 14 and the low-speed compressor 23. In certain embodiments, the first bearing assembly 151 and the gear assembly 300 are each connected to the first frame 161. A second frame 162 is positioned in serial flow arrangement between the low-speed compressor 23 and the high-speed compressor 24. In certain embodiments, the second bearing assembly 152 and the third bearing assembly 153 are each connected to the second frame 162. A third frame 163 is positioned between the high-speed turbine 28 and the interdigitated turbine assembly 100. In certain embodiments, the fourth bearing assembly 154 and the fifth bearing assembly 155 are each connected to the third frame 163. A fourth frame 164 may be positioned aft of the interdigitated turbine assembly 100. In certain embodiments, the sixth bearing assembly 156 is connected to the fourth frame 164.

Referring to FIG. 2, various embodiments of the bearing assemblies may be configured to provide radial support and receive thrust loads produced by the engine 10. The bearing assemblies include any suitable type of radial and/or axial load bearing, including, but not limited to, rolling element bearings, roller bearings, ball bearings, tapered roller bearings, spherical roller bearings, fluid film bearings, overturning moment bearings, or combinations thereof. In certain embodiments, the first bearing assembly 151 is configured as a radial load bearing at the fan assembly 14. The second bearing assembly 152 and the third bearing assembly 153 may each include any suitable combination of radial and axial load bearing, such as a roller bearing and a ball bearing. The fourth bearing assembly 154, the fifth bearing assembly 155, and the sixth bearing assembly 156 may each be configured as a radial load bearing at each respective shaft 22, 27, 29.

Referring to FIG. 2, and further detailed in FIG. 4, the gear assembly 300 includes a support structure 302 statically fixed relative to the engine centerline axis 12. In certain embodiments, the support structure 302 may be attached, connected, or integral to the first frame 161. In certain embodiments, the first bearing assembly 151 is supported by the support structure 302. The support structure 302 may further support a seventh bearing assembly 157 coupled to the second shaft 29 and the gear assembly 300. The seventh bearing assembly 157 may include one or more thrust bearings configured to receive or balance an axial thrust load from the fan assembly 14 and the interdigitated turbine assembly 100. In certain embodiments, the seventh bearing assembly 157 is coupled to the output shaft assembly 141 and is supported via the support structure 302.

The gear assembly 300 includes a first stage gear 311 operably coupled to the first shaft 27, the support structure 302, and a first ring gear 143. The output shaft assembly 141 is connected to the fan assembly 14 to transmit torque and power from the interdigitated turbine assembly 100 via the first shaft 27 and the second shaft 29. The first ring gear 143 is connected to the output shaft assembly 141. The output shaft assembly 141 including the first ring gear 143 is configured to rotate relative to the engine centerline axis 12 with the fan assembly 14. The first stage gear 311 is may generally include a plurality of the first stage gear 311 positioned in circumferential arrangement relative to the engine centerline axis 12. Each first stage gear 311 is circumferentially fixed relative to the engine centerline axis 12 by the support structure 302. Each first stage gear 311 is rotatable relative to its respective gear centerline axis 121 (FIG. 4). During operation of the engine 10, energy from rotation of the first shaft 27 is transmitted through the plurality of the first stage gear 311 to the output shaft assembly 141 via the first ring gear 143.

The gear assembly 300 further includes a second stage gear 312 operably coupled to the second shaft 29, the output shaft assembly 141, and a second ring gear 144. The second stage gear 312 is operably coupled to the output shaft assembly 141. In various embodiments, the output shaft assembly 141 includes a plurality of the second stage gear 312 in circumferential arrangement relative to the engine centerline axis 12. The second stage gear 312 is configured to allow each respective gear centerline axis to rotate around the engine centerline axis 12. The second stage gear 312 is further configured to allow each respective second stage gear 312 to rotate relative to each respective gear centerline axis (FIG. 4). The second ring gear 144 is connected to the support structure 302. As such, the second ring gear 144 is circumferentially fixed relative to the engine centerline axis 12. During operation of the engine 10, energy from rotation of the second shaft 29 is transmitted to the output shaft assembly 141 via the second stage gear 312. The second ring gear 144 provides statically determinative behavior to allow the second stage gear 312 and output shaft assembly 141 to rotate around the engine centerline axis 12 as power and torque is received from the second shaft 29.

Particular embodiments of the gear assembly 300 are configured to receive power from the interdigitated turbine assembly 100 via the first shaft 27 and first turbine rotor 32 at a first rotational speed and from the second shaft 29 and second turbine rotor 30 at a second rotational speed different from the first rotational speed. Furthermore, in particular embodiments, the gear assembly 300 is configured to transmit power to the fan assembly 14 via the output shaft assembly 141 at a third rotational speed different from the first rotational speed and the second rotational speed. In still particular embodiments, the first turbine rotor 32 is configured to rotate in a first circumferential direction opposite of the second turbine rotor 30 in a second circumferential direction (i.e., counter-rotating rotor assembly). The first turbine rotor 32 and the second turbine rotor 30 may together form the interdigitated turbine assembly 100 as a vaneless counter-rotating turbine assembly.

In various embodiments, the gear assembly 300 depicted and described herein is configured as a two-stage axially parallel planetary-star gear assembly. In certain embodiments, the first stage gear 311 is a planetary gear. In still certain embodiments, the second stage gear 312 is a planetary gear. In various embodiments, the first shaft 27 and the second shaft 29 each form star gears. Various embodiments of the engine provided herein are configured for the first turbine rotor, the second turbine rotor, and the fan assembly to rotate at three-different rotational speeds during operation of the engine. The first turbine rotor and the second turbine rotor are each configured to operate at higher rotational speeds than the fan assembly. The first turbine rotor and the second turbine rotor are together configured to rotate up to twice (2×) greater than the other. In certain embodiments, the second turbine rotor is configured to rotate at a greater rotational speed than the first turbine rotor. However, in other embodiments, the first turbine rotor may be configured to rotate at a greater rotational speed than the second turbine rotor.

In particular embodiments, the first stage gear 311 is configured to receive power from the first shaft 27 at the first rotational speed lower than the second rotational speed received at the second stage gear 312 from the second shaft 29. Stated differently, the gear assembly 300 is configured to allow the first turbine rotor 32 to rotate slower than the second turbine rotor 30. In still certain embodiments, the gear assembly 300 includes a first gear ratio at the first stage gear 311 and a second gear ratio at the second stage gear 312 greater than the first gear ratio. It should be appreciated that the gear ratio corresponds to a ratio of the respective turbine rotor rotational speed to the fan assembly rotational speed. In one embodiment, the second gear ratio is greater than 1:1 and is 14:1 or less, i.e., the rotational speed at the mid-speed spool is greater than the fan assembly rotational speed and 14× or less than the fan assembly rotational speed. In another embodiment, the first gear ratio is greater than 1:1 and less than the second gear ratio i.e., the rotational speed of the low-speed spool is greater than the fan assembly rotational speed and less than the mid-speed spool rotational speed. In still another embodiment, the second gear ratio is 14:1 or less and greater than 3:1. In yet another embodiment, the second gear ratio is 10:1. In still yet another embodiment, the second gear ratio is 7:1 or less.

In particular embodiments, the second gear ratio is at least 16% greater than the first gear ratio. In some embodiments, the second gear ratio is greater than the first gear ratio by 133% or less. In a still particular embodiment, the second gear ratio is greater than the first gear ratio by 100% or less. In one embodiment, the second gear ratio is 7:1 and the first gear ratio is 6:1.

It should be appreciated that various embodiments of the engine depicted and described herein may interchange the proportions, ratios, or percentages of the first gear ratio and the second gear ratio. Various embodiments of the engine may interchange the first turbine rotor for the second turbine rotor. In still various embodiments, the first turbine rotor may be configured to operate at a greater rotational speed than the second turbine rotor based on ranges, proportions, ratios, or percentages provided herein.

Referring to FIG. 2, and in further detail in FIG. 3, the interdigitated turbine assembly 100 is configured to generate an average stage pressure ratio between 1.3 and 1.9 and a maximum $AN^2$ between 30 and 90 relative to the second turbine rotor 30. In one embodiment, the average stage pressure ratio is between 1.3 and 1.7 with the maximum $AN^2$ between 30-70. In another embodiment, the average stage pressure ratio is between 1.5 and 1.9 with the maximum $AN^2$ between 71-90. In a particular embodiment, the maximum $AN^2$ is generated relative to the rotatable frame at the second turbine rotor 30. In various embodiments, the interdigitated turbine assembly 100 generates the average stage pressure ratio and maximum $AN^2$ via a total number of stages between 3 and 8. In one embodiment, the second turbine rotor 30 includes an equal quantity of stages as the first turbine rotor 32. In another embodiment, the second turbine rotor 30 includes one stage more than the first turbine rotor 32.

It should be appreciated that particular ranges of the average stage pressure ratio provided herein correspond to particular quantities of blades at the interdigitated turbine assembly 100 as understood by one skilled in the art based on a desired configuration of heat addition system 26 and heat release generated therefrom. Furthermore, the average stage pressure ratio corresponds to specific ranges of gear ratios at the gear assembly 300 provided herein. Still furthermore, the average stage pressure ratio corresponds to specific ranges of maximum blade tip rotational speed at the fan assembly 14 of up to 750 fps.

In particular embodiments, the quantity of blades 21 is between three (3) and twenty (20). In still certain embodiments, a sum of the quantity of fan blades 13 and the quantity of vanes 15 is between twenty (20) and thirty (30). The particular quantities or ranges of blades to vanes provided herein may provide particularly desirable ratios of increased thrust output versus decreased noise generation, decreased weight, decreased dimensions, and reduced specific fuel consumption, and combinations thereof, over known engine arrangements. Still further, combinations of particular ranges or limits of blade tip speed at the fan assembly 14, gear ratios at the gear assembly 300, average stage pressure ratio and $AN^2$ at the interdigitated turbine section 100, and structures corresponding therewith provide particular and unexpected benefits over known fan assemblies, gear assemblies, or turbine sections.

For instance, although various embodiments of interdigitated or vaneless turbines are known in the art, the present disclosure provides particular ranges of average stage pressure ratio and $AN^2$ and structures that correspond to ranges of flowpath area and blade quantity particularly beneficial for providing high fan bypass ratios, increased engine efficiency, reduced weight, increased thrust output, and reduced noise generation.

In another instance, although various gear assemblies are known in the art, the present disclosure provides particular structures and ranges of gear ratios relative to particular ranges of fan assembly blade tip speed and interdigitated turbine assembly speed, pressure ratio, and flowpath area particularly beneficial for providing increased thrust output, reduced noise generation at the fan assembly and/or core engine, reduced specific fuel consumption, reduced weight, increased engine efficiency, and greater fan bypass ratios.

In yet another instance, although various fan assemblies are known in the art, the present disclosure provides particular ranges of fan blade quantities and ratios of fan blades to vanes to generate particularly beneficial ratios of thrust output to noise generation for unducted single rotor engines. Particular ranges and structures of gear assemblies and interdigitated turbine assemblies described herein further allow for such thrust output and noise generation benefits without undesired losses due to excessive weight (e.g., via large gear assemblies and/or turbine sections), excessive rotational speed input to the gear assembly, or excessive heat generation and release from a heat addition system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A gas turbine engine having an interdigitated turbine assembly including a first turbine rotor and a second turbine rotor, wherein a total number of stages at the interdigitated turbine assembly is between 3 and 8, and an average stage pressure ratio at the interdigitated turbine assembly is between 1.3 and 1.9. A gear assembly is configured to receive power from the interdigitated turbine assembly, and a fan assembly is configured to receive power from the gear assembly. The interdigitated turbine assembly and the gear assembly are together configured to allow the second turbine rotor to rotate at a second rotational speed greater than a first rotational speed at the first turbine rotor. The fan assembly and the gear assembly are together configured to allow the fan assembly to rotate at a third rotational speed less than the first rotational speed and the second rotational speed. The interdigitated turbine assembly, the gear assembly, and the fan assembly together have a maximum $AN^2$ at the second turbine rotor between 30 and 90.

2. The gas turbine engine of any clause herein, wherein the gear assembly is a two-stage parallel planetary-star gear assembly.

3. The gas turbine engine of any clause herein, the engine including a first shaft operably coupled to the first turbine rotor and a first stage gear at the gear assembly, and a second shaft operably coupled to the second turbine rotor and a second stage gear at the gear assembly.

4. The gas turbine engine of any clause herein, wherein the first stage gear includes a first stage gear ratio relative to the first turbine rotor and the fan assembly, and wherein the second stage gear includes a second stage gear ratio relative to the second turbine rotor and the fan assembly, and wherein the second stage gear ratio is between 16% and 133% greater than the first stage gear ratio, or between 16% and 100% greater than the first stage gear ratio, or configured to allow the second turbine rotor to operate at up to twice (2×) the speed of the first turbine rotor.

5. The gas turbine engine of any clause herein, wherein an output shaft assembly is operably connected to the fan assembly, the first stage gear, and the second stage gear.

6. The gas turbine engine of any clause herein, wherein the second gear ratio is greater than 1:1, and wherein the second gear ratio is 14:1 or less.

7. The gas turbine engine of any clause herein, wherein the average stage pressure ratio is between 1.3 and 1.7 with the maximum $AN^2$ between 30-70.

8. The gas turbine engine of any clause herein, wherein the average stage pressure ratio is between 1.5 and 1.9 with the maximum $AN^2$ between 71-90.

9. The gas turbine engine of any clause herein, wherein the second turbine rotor has an equal quantity of stages as the first turbine rotor.

10. The gas turbine engine of any clause herein, wherein the second turbine rotor has one stage more than the first turbine rotor.

11. The gas turbine engine of any clause herein, wherein the fan assembly has between 3 and 20 blades.

12. The gas turbine engine of any clause herein, wherein a vane assembly is positioned aerodynamically aft of the fan assembly, and wherein a sum of a quantity of blades at the fan assembly and a quantity of vanes at the vane assembly is between 20 and 30.

13. The gas turbine engine of any clause herein, wherein the gas turbine engine is an unducted gas turbine engine.

14. The gas turbine engine of any clause herein, wherein the first turbine rotor includes a plurality of first rotors extended outward along a radial direction, and wherein the second turbine rotor includes a plurality of second rotor blades extended inward along the radial direction from a rotatable drum, and wherein the second rotor comprises a rotatable frame configured to support the rotatable drum and the second rotor blades, and wherein the total number of stages consists of the plurality of first rotors, the plurality of second rotor blades, and the rotatable frame.

15. A gas turbine engine, the engine including an interdigitated turbine assembly that includes a first turbine rotor and a second turbine rotor, wherein a total number of stages at the interdigitated turbine assembly is between 3 and 8, the total number of stages consisting of a plurality of first rotors of the first turbine rotor, a plurality of second rotor blades extended from a rotatable drum of the second turbine rotor, and a rotatable frame, and wherein an average stage pressure ratio at the interdigitated turbine assembly relative to the rotatable frame is between 1.3 and 1.9. A gear assembly is configured to receive power from the interdigitated turbine assembly. An unducted fan assembly is configured to receive power from the gear assembly. The interdigitated turbine assembly and the gear assembly are together configured to allow the second turbine rotor to rotate at a second rotational speed greater than a first rotational speed at the first turbine rotor. The fan assembly and the gear assembly are together configured to allow the fan assembly to rotate at a third rotational speed less than the first rotational speed at the first turbine rotor and the second rotational speed at the second turbine rotor, and the interdigitated turbine assembly, the gear assembly, and the unducted fan assembly together have a maximum $AN^2$ at the second turbine rotor between 30 and 90.

16. The gas turbine engine of any clause herein, wherein the gear assembly is a two-stage parallel planetary-star gear assembly.

17. The gas turbine engine of any clause herein, wherein the gear assembly includes a first stage gear having a first stage gear ratio relative to the first turbine rotor and the fan assembly, and a second stage gear having a second stage gear ratio relative to the second turbine rotor and the fan assembly, wherein the second stage gear ratio is between 16% and 100% greater than the first stage gear ratio.

18. The gas turbine engine of any clause herein, wherein the second gear ratio is greater than 1:1, and wherein the second gear ratio is 14:1 or less.

19. The gas turbine engine of any clause herein, wherein the fan assembly has between 3 and 20 blades.

20. The gas turbine engine of any clause herein, wherein the average stage pressure ratio corresponds to a maximum blade tip rotational speed at the fan assembly of 750 feet per second.

What is claimed is:

1. A gas turbine engine, the engine comprising:
an interdigitated turbine assembly comprising a first turbine rotor and a second turbine rotor, wherein a total number of stages at the interdigitated turbine assembly is between 3 and 8, and wherein an average stage pressure ratio at the interdigitated turbine assembly is between 1.3 and 1.9;
a gear assembly configured to receive power from the interdigitated turbine assembly; and
a fan assembly configured to receive power from the gear assembly,
wherein the interdigitated turbine assembly and the gear assembly are together configured to allow the second turbine rotor to rotate at a second rotational speed greater than a first rotational speed at the first turbine rotor,
wherein the fan assembly and the gear assembly are together configured to allow the fan assembly to rotate at a third rotational speed less than the first rotational speed at the first turbine rotor and the second rotational speed at the second turbine rotor,
wherein the interdigitated turbine assembly, the gear assembly, and the fan assembly together have a maximum $AN^2$ at the second turbine rotor between 30 and 90,
wherein the gear assembly is a two-stage parallel planetary-star gear assembly,
wherein the engine further comprises:
a first shaft operably coupled to the first turbine rotor and a first stage gear at the gear assembly, and
a second shaft operably coupled to the second turbine rotor and a second stage gear at the gear assembly,
wherein the first stage gear comprises a first stage gear ratio relative to the first turbine rotor and the fan assembly,
wherein the second stage gear comprises a second stage gear ratio relative to the second turbine rotor and the fan assembly, and
wherein the second stage gear ratio is between 16% and 133% greater than the first stage gear ratio.

2. The gas turbine engine of claim 1, wherein an output shaft assembly is operably connected to the fan assembly, the first stage gear, and the second stage gear.

3. The gas turbine engine of claim 2, wherein the second gear ratio is greater than 1:1, and wherein the second gear ratio is 14:1 or less.

4. The gas turbine engine of claim 1, wherein the average stage pressure ratio is between 1.3 and 1.7 with the maximum AN2 between 30-70.

5. The gas turbine engine of claim 1, wherein the average stage pressure ratio is between 1.5 and 1.9 with the maximum AN2 between 71-90.

6. The gas turbine engine of claim 1, wherein the second turbine rotor has an equal quantity of stages as the first turbine rotor.

7. The gas turbine engine of claim 1, wherein the second turbine rotor has one stage more than the first turbine rotor.

8. The gas turbine engine of claim 1, wherein the fan assembly has between 3 and 20 blades.

9. The gas turbine engine of claim 8, wherein a vane assembly is positioned aerodynamically aft of the fan assembly, and wherein a sum of a quantity of blades at the fan assembly and a quantity of vanes at the vane assembly is between 20 and 30.

10. The gas turbine engine of claim 9, wherein the gas turbine engine is an unducted gas turbine engine.

11. The gas turbine engine of claim 1, wherein the first turbine rotor comprises a plurality of first rotors extended outward along a radial direction, and wherein the second turbine rotor comprises a plurality of second rotor blades extended inward along the radial direction from a rotatable drum, and wherein the second rotor comprises a rotatable frame configured to support the rotatable drum and the second rotor blades, and wherein the total number of stages consists of the plurality of first rotors, the plurality of second rotor blades, and the rotatable frame.

12. A gas turbine engine, the engine comprising:
an interdigitated turbine assembly comprising a first turbine rotor and a second turbine rotor, wherein a total number of stages at the interdigitated turbine assembly is between 3 and 8, the total number of stages comprising a plurality of first rotors of the first turbine rotor, a plurality of second rotor blades extended from a rotatable drum of the second turbine rotor, and a rotatable frame, and wherein an average stage pressure ratio at the interdigitated turbine assembly relative to the rotatable frame is between 1.3 and 1.9;
a gear assembly configured to receive power from the interdigitated turbine assembly; and
an unducted fan assembly configured to receive power from the gear assembly,
wherein the interdigitated turbine assembly and the gear assembly are together configured to allow the second turbine rotor to rotate at a second rotational speed greater than a first rotational speed at the first turbine rotor,
wherein the fan assembly and the gear assembly are together configured to allow the fan assembly to rotate at a third rotational speed less than the first rotational speed at the first turbine rotor and the second rotational speed at the second turbine rotor,
wherein the interdigitated turbine assembly, the gear assembly, and the unducted fan assembly together have a maximum AN2 at the second turbine rotor between 30 and 90, and
wherein the gear assembly comprises:
a first stage gear having a first stage gear ratio relative to the first turbine rotor and the fan assembly; and
a second stage gear having a second stage gear ratio relative to the second turbine rotor and the fan assembly, wherein the second stage gear ratio is between 16% and 100% greater than the first stage gear ratio.

13. The gas turbine engine of claim 12, wherein the gear assembly is a two-stage parallel planetary-star gear assembly.

14. The gas turbine engine of claim 12, wherein the second gear ratio is greater than 1:1, and wherein the second gear ratio is 14:1 or less.

15. The gas turbine engine of claim 12, wherein the fan assembly has between 3 and 20 blades.

16. The gas turbine engine of claim 12, wherein the average stage pressure ratio corresponds to a maximum blade tip rotational speed at the fan assembly of 750 feet per second.

* * * * *